United States Patent [19]
Overcash et al.

[11] Patent Number: 5,981,011
[45] Date of Patent: *Nov. 9, 1999

[54] COATED SHEET MATERIAL

[75] Inventors: Derric T. Overcash; Ronald L. Elsenbaumer, both of Arlington, Tex.

[73] Assignee: **A*Ware Technologies, L.C.**, Dallas, Tex.

[*] Notice: This patent is subject to a terminal disclaimer.

[21] Appl. No.: 08/369,135

[22] Filed: Jan. 5, 1995

Related U.S. Application Data

[63] Continuation-in-part of application No. 07/823,877, Jan. 22, 1992, Pat. No. 5,603,996.

[51] Int. Cl.$^6$ .......................... B32B 27/06; B32B 27/10; B32B 27/30; B32B 27/32
[52] U.S. Cl. .................. 428/40.9; 428/34.2; 428/36.6; 428/36.7; 428/41.8; 428/425.1; 428/452; 428/479.6; 428/481; 428/507; 428/511; 428/514
[58] Field of Search .................. 428/34.2, 35.7, 428/36.6, 36.7, 352, 507, 508, 511, 514, 40.9, 41.8, 425.1, 452, 479.6, 481; 525/56, 61, 62

[56] References Cited

U.S. PATENT DOCUMENTS

| | | | |
|---|---|---|---|
| Re. 32,270 | 10/1986 | Murray, Jr. | 428/335 |
| 2,273,040 | 2/1942 | Iler | 91/68 |
| 2,899,922 | 8/1959 | Wheeler | 113/42 |
| 2,975,018 | 3/1961 | Schubert et al. | 8/94.1 |
| 3,099,377 | 7/1963 | Metzler et al. | 229/2.5 |
| 3,102,772 | 9/1963 | Robinson, Jr. | 8/94.27 |
| 3,229,886 | 1/1966 | Grogel | 229/3.5 |
| 3,238,078 | 3/1966 | Baldwin | 156/87 |
| 3,463,651 | 8/1969 | Warsager | 117/3.3 |
| 3,493,106 | 2/1970 | Galli | 206/65 |
| 3,496,896 | 2/1970 | Smith | 113/120 |
| 3,607,527 | 9/1971 | Morley et al. | 156/238 |
| 3,627,719 | 12/1971 | Lucie et al. | 260/29.2 |
| 3,640,735 | 2/1972 | Oppenheimer et al. | 99/176 |
| 3,655,481 | 4/1972 | Hall | 156/272 |
| 3,656,991 | 4/1972 | Blackwell et al. | 117/33.3 |
| 3,713,798 | 1/1973 | Stilley et al. | 65/106 |
| 3,733,346 | 5/1973 | Bride | 260/438.5 |
| 3,793,067 | 2/1974 | Gallino | 117/155 |
| 3,804,661 | 4/1974 | Muntzer et al. | 117/62.2 |
| 3,807,977 | 4/1974 | Johnston et al. | 44/62 |

(List continued on next page.)

FOREIGN PATENT DOCUMENTS

| | | |
|---|---|---|
| 009885 A1 | 4/1980 | European Pat. Off. . |
| 0237235 | 9/1987 | European Pat. Off. . |
| 0245005 | 11/1987 | European Pat. Off. . |
| 0315297 | 5/1989 | European Pat. Off. . |
| 0341937 | 11/1989 | European Pat. Off. . |
| 0622310A2 | 11/1994 | European Pat. Off. . |
| 0705757A1 | 4/1996 | European Pat. Off. . |
| 3835796 | 5/1989 | Germany . |
| 5-155919 | 6/1993 | Japan . |
| 5768794 | 3/1994 | Japan . |
| WO 9314642 | 8/1993 | WIPO . |
| WO 9620832 | 7/1996 | WIPO . |

OTHER PUBLICATIONS

Supplementary European Search Report, Jul. 2, 1998.

*Primary Examiner*—Vivian Chen
*Attorney, Agent, or Firm*—Baker & Botts, L.L.P.

[57] ABSTRACT

A coated sheet material made by : (a) coating a porous substrate sheet material with a barrier coating composition comprising (i) a cross-linkable polymer resistant to penetration by water moisture, and (ii) a water-dispersible film-forming polymer that is resistant to penetration by grease and oil, said barrier coating composition forming a barrier layer on said substrate sheet material; and (b) coating said barrier layer with a release coating composition wherein the cross-linkable polymer and the water-dispersible film-forming polymer are different. The coated sheet material is useful in forming articles and food wrappers for use in conventional or microwave ovens.

33 Claims, 2 Drawing Sheets

U.S. PATENT DOCUMENTS

| | | | |
|---|---|---|---|
| 3,811,848 | 5/1974 | Johnson | 44/62 |
| 3,819,773 | 6/1974 | Pears | 264/37 |
| 3,847,655 | 11/1974 | Crimmel et al. | 117/126 |
| 3,869,488 | 3/1975 | Bride | 260/438.5 |
| 3,875,211 | 4/1975 | Steckler | 260/486 |
| 3,886,070 | 5/1975 | Martineau et al. | 210/47 |
| 3,887,390 | 6/1975 | Deiner | 106/271 |
| 3,890,158 | 6/1975 | Cushman et al. | 106/271 |
| 3,922,143 | 11/1975 | Schuster et al. | 8/94.21 |
| 3,924,013 | 12/1975 | Kane | 426/523 |
| 3,940,385 | 2/1976 | Smith | 260/23.7 |
| 3,954,496 | 5/1976 | Batzar | 106/308 |
| 3,979,532 | 9/1976 | Mück et al. | 427/245 |
| 3,985,849 | 10/1976 | Notomi et al. | 264/95 |
| 3,994,212 | 11/1976 | Wong | 99/444 |
| 4,006,079 | 2/1977 | Langlois et al. | 210/36 |
| 4,012,352 | 3/1977 | Deyrup | 260/29.6 BM |
| 4,012,552 | 3/1977 | Watts | 428/200 |
| 4,022,643 | 5/1977 | Clark | 156/78 |
| 4,073,733 | 2/1978 | Yamauchi et al. | 210/500 |
| 4,075,389 | 2/1978 | Vassiliades et al. | 428/306 |
| 4,085,244 | 4/1978 | Stillman | 428/192 |
| 4,096,309 | 6/1978 | Stillman | 428/285 |
| 4,110,494 | 8/1978 | Schindler et al. | 427/385 |
| 4,129,183 | 12/1978 | Kalfoglou | 166/300 |
| 4,134,004 | 1/1979 | Anderson et al. | 219/387 |
| 4,141,911 | 2/1979 | Matsumoto et al. | 260/438.5 |
| 4,147,836 | 4/1979 | Middleton et al. | 428/481 |
| 4,153,494 | 5/1979 | Vilaprinyo Oliva | 156/230 |
| 4,173,823 | 11/1979 | Anderson et al. | 29/611 |
| 4,182,788 | 1/1980 | Vassiliades et al. | 428/40 |
| 4,214,035 | 7/1980 | Heberger | 428/340 |
| 4,215,170 | 7/1980 | Vilaprinyo Oliva | 428/328 |
| 4,216,268 | 8/1980 | Stillman | 428/424.8 |
| 4,230,654 | 10/1980 | Kuga et al. | 264/134 |
| 4,250,209 | 2/1981 | de Leeuw et al. | 427/250 |
| 4,260,060 | 4/1981 | Faller | 206/622 |
| 4,277,506 | 7/1981 | Austin | 426/111 |
| 4,279,933 | 7/1981 | Austin et al. | 426/124 |
| 4,287,264 | 9/1981 | Marginean | 428/514 |
| 4,287,274 | 9/1981 | Ibbotson et al. | 429/156 |
| 4,288,497 | 9/1981 | Tanaka et al. | 428/447 |
| 4,304,815 | 12/1981 | Cugasi, Jr. | 428/280 |
| 4,309,466 | 1/1982 | Stillman | 428/35 |
| 4,337,116 | 6/1982 | Foster et al. | 162/158 |
| 4,343,858 | 8/1982 | Thompson | 428/342 |
| 4,349,402 | 9/1982 | Parker | 156/233 |
| 4,365,739 | 12/1982 | Webinger | 229/32 |
| 4,371,110 | 2/1983 | Kulig | 229/31 |
| 4,372,986 | 2/1983 | Imada et al. | 427/40 |
| 4,387,126 | 6/1983 | Rebholz | 428/35 |
| 4,388,137 | 6/1983 | McCarty et al. | 156/275.5 |
| 4,391,833 | 7/1983 | Self et al. | 426/523 |
| 4,418,119 | 11/1983 | Morrow et al. | 428/342 |
| 4,421,825 | 12/1983 | Seiter et al. | 428/332 |
| 4,440,574 | 4/1984 | Bruno | 106/2 |
| 4,442,252 | 4/1984 | Sumi et al. | 524/183 |
| 4,456,164 | 6/1984 | Foster et al. | 229/43 |
| 4,463,029 | 7/1984 | Nishijima et al. | 427/209 |
| 4,469,258 | 9/1984 | Wright et al. | 229/43 |
| 4,473,422 | 9/1984 | Parker et al. | 156/233 |
| 4,486,483 | 12/1984 | Caines | 428/195 |
| 4,487,789 | 12/1984 | Iwanami et al. | 427/407.1 |
| 4,518,651 | 5/1985 | Wolfe, Jr. | 428/308.8 |
| 4,525,423 | 6/1985 | Lynn et al. | 428/421 |
| 4,529,464 | 7/1985 | Jones | 156/244.24 |
| 4,539,048 | 9/1985 | Cohen | 106/287.17 |
| 4,539,049 | 9/1985 | Cohen | 106/287.17 |
| 4,543,280 | 9/1985 | Fujita et al. | 428/35 |
| 4,624,985 | 11/1986 | Tsutsumi et al. | 524/803 |
| 4,673,698 | 6/1987 | Krankkala | 524/47 |
| 4,698,246 | 10/1987 | Gibbons et al. | 428/35 |
| 4,699,845 | 10/1987 | Oikawa et al. | 428/480 |
| 4,731,266 | 3/1988 | Bonnebat et al. | 428/35 |
| 4,735,513 | 4/1988 | Watkins et al. | 383/116 |
| 4,757,940 | 7/1988 | Quick et al. | 229/3.5 |
| 4,784,708 | 11/1988 | Allen | 156/67 |
| 4,795,801 | 1/1989 | Farge et al. | 528/392 |
| 4,813,594 | 3/1989 | Brown et al. | 229/103 |
| 4,826,719 | 5/1989 | Murdock et al. | 428/182 |
| 4,875,961 | 10/1989 | Oike et al. | 156/234 |
| 4,892,602 | 1/1990 | Oike et al. | 156/233 |
| 4,900,594 | 2/1990 | Quick et al. | 428/34.2 |
| 4,906,679 | 3/1990 | Tokuno et al. | 524/183 |
| 4,929,476 | 5/1990 | Gibbons et al. | 428/34.2 |
| 4,930,681 | 6/1990 | Fultz et al. | 229/114 |
| 4,935,282 | 6/1990 | Pawlowski et al. | 428/121 |
| 4,940,612 | 7/1990 | Gibbons et al. | 428/34.2 |
| 4,990,378 | 2/1991 | Jones | 427/420 |
| 5,002,833 | 3/1991 | Kinsey, Jr. et al. | 428/475.8 |
| 5,029,714 | 7/1991 | Cassidy | 206/631 |
| 5,030,404 | 7/1991 | Bonnebat et al. | 264/185 |
| 5,096,940 | 3/1992 | Mor | 523/125 |

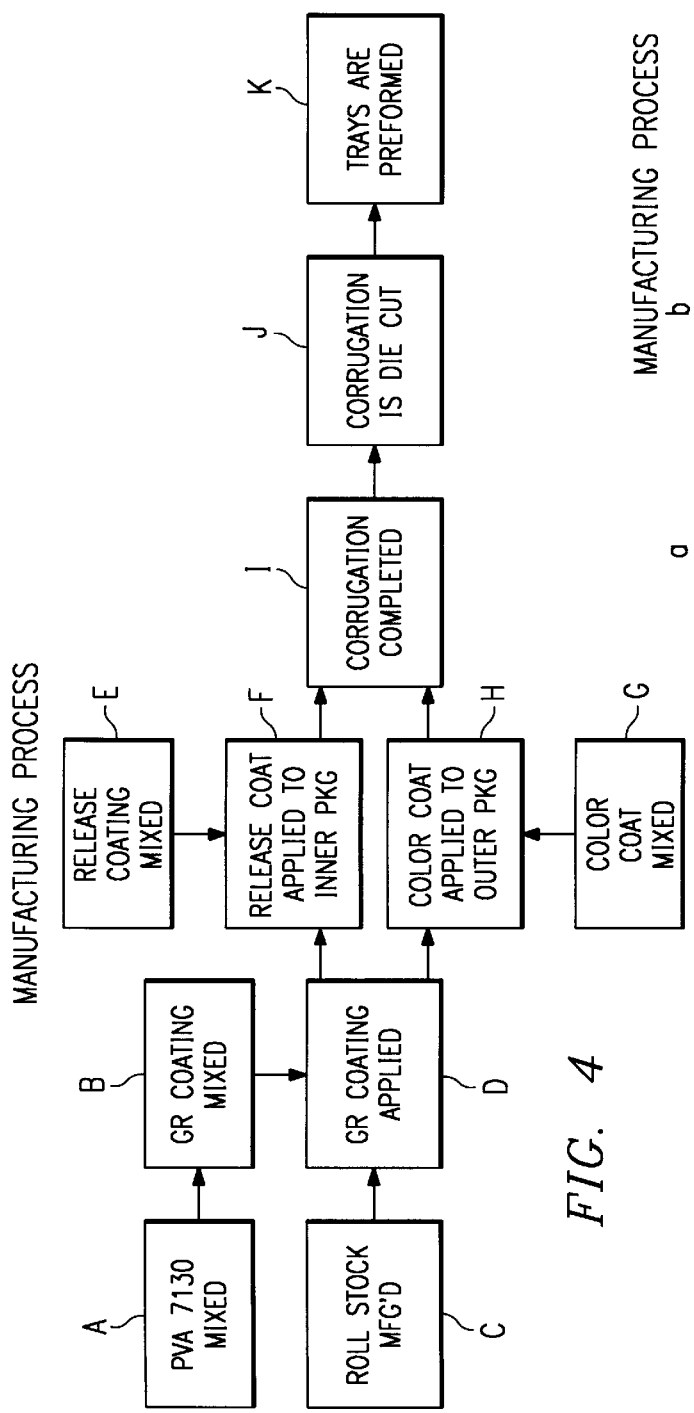
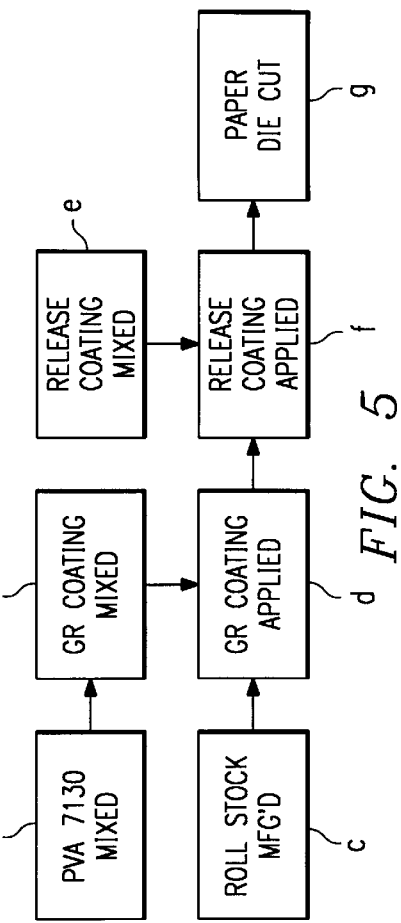
FIG. 4
FIG. 5

000
COATED SHEET MATERIAL

This application is a continuation-in-part of U.S. Pat. application, Ser. No. 07/823,877, filed Jan. 22, 1992, which issued as U.S. Pat. No. 5,603,996, on Feb. 18, 1997.

TECHNICAL FIELD OF THE INVENTION

This invention relates generally to coated sheet materials for use in making ovenable containers, food wrappers and the like, and to ovenable containers, food wrappers and the like formed from such coated sheet materials. The invention also relates to methods for making same.

BACKGROUND OF THE INVENTION

One of the most common types of containers used for heating food in an oven is the aluminum pan, or other such containers made of a thin sheet of aluminum or aluminum foil. Such aluminum containers may be preformed into a specific shape, thus avoiding the labor required for assembly of the shaped article, and can be easily stacked, thus allowing for easy storage and dispensing therefrom for use. Furthermore, such aluminum containers are resistant to penetration by grease or oil, or by water moisture, and permit good browning of baked goods that are baked therein. An example of these sorts of aluminum containers is disclosed in U.S. Pat. No. 3,494,896 to Smith. Though strong and readily preformable, aluminum containers generally cannot be used in microwave cooking. Consequently, efforts have been made to develop plastic containers and plastic-coated paper structures that can withstand heating in either conventional or microwave ovens—i.e., that are "dual-ovenable." To be "ovenable" for purposes of a conventional oven, a structure should be able to withstand temperatures of up to at least 300° F. and, preferably, about 400° F. or so; to be "ovenable" for purposes of a microwave oven, the structure should be strong at boiling water temperatures and should not reflect microwaves and thereby cause arcing or damage the oven's microwave generation. Furthermore, concurrent with such efforts directed at developing dual-ovenable containers, there has been interest in achieving this result without increasing the cost of the container, or preferable by decreasing such cost. One development in this area has been the use of extruded films of polyethylene terephthalate (PET), or polybutylene terephthalate (PBT), adhered to a paper material for oven-heatable trays. For example, U.S. Pat. No. 4,900,594 to Quick et al. discloses an ovenable tray made with a bi-axially oriented film of PET, such as MYLAR™. The PET film is adhered to a paperboard substrate by means of an adhesive. A shaped tray is formed from the PET-paperboard laminate by pressure-forming procedures such as that described in U.S. Pat. No. 4,026,458 to Morris et al. However, such PET-paperboard laminates are generally not biodegradable, or not readily so, and are not readily gluable to form trays simply by folding the corners in appropriate configuration and applying an appropriate glue or adhesive. Rather, as noted above, ovenable trays are formed from the PET-paperboard laminate generally by pressure-forming the laminate into the desired shape.

Another approach has been to form a laminate by extruding layers of polymethylpentene, tie resins, and barrier resins onto a paper substrate, as is disclosed in U.S. Pat. No. 5,002,833 to Kinsey, Jr. et al. The resulting product is said to have a high degree of adhesion between the paper substrate and the polymethylpentene food contact layer, and is said to be capable of being utilized for forming pressed or locked corner food trays which can be subjected to oven cooking temperatures. The laminate may be made by co-extruding, directly onto a paper substrate, a three-layer sandwich comprised of a barrier resin (such as polyamide resins, copolyamide resins such as nylon resins, polyester resins, or copolyester resins), a tie resin (such as chemically modified graft copolymers of methylpentene), and a release layer of polymethylpentene (the food contacting layer). The structure so made makes up a three layer coextrusion on a paper substrate. From a manufacturing standpoint, however, the extrusion or coextrusion process is more difficult and costly than a simple coating process and requires appropriate extruding equipment.

Yet another approach has been to coat a mixture of polyvinyl alcohol ("PVA") and a chrome-fatty acid complex known as "Quilon®" onto a non-porous paper substrate such as pan liner paper. Alternatively, the pan liner paper may be coated with PVA followed by a coating of Quilon®. The pan liner paper so coated may be added to a conventional baking tray to provide release of food from the tray. However, such pan liner paper lacks the dimensional stability and strength to be used to form an ovenable tray by itself. Furthermore, such pan liner paper provides poor food-browning and is expensive relative to less costly, more porous grades of paper, such as Kraft paper or newsprint paper.

It is therefore desirable to produce a sheet material simply and economically that has the strength and dimensional stability to function as a cooking or baking tray, that may be used in both conventional and microwave ovens (i.e., that may be "dual-ovenable"), that is resistant to penetration by water moisture and by grease and oil (particularly at elevated temperatures), and that is readily formable and gluable to form a tray or other shaped article. Furthermore, it is desirable that such a sheet material allow for superior browning of baked goods and good release of items that may be used in the tray. It is further desirable that such sheet material have an aesthetically pleasing appearance.

SUMMARY OF THE INVENTION

One aspect of the present invention includes a novel coated sheet material comprising: (a) a porous substrate sheet material with a barrier coating composition comprised of (i) a cross-linkable polymer resistant to penetration by water moisture, and (ii) a water-dispersable film-forming polymer that is resistant to penetration by grease and oil, said barrier coating composition forming a barrier layer on said substrate sheet material; and (b) a release coating composition. Said coated sheet material may be folded and/or otherwise shaped, and then glued, without loss of performance to form a shaped article, such as a baking tray. Thus, the present invention relates to such novel coated sheet material, shaped articles made therefrom, and methods of making such coated sheet materials and shaped articles.

As discussed more fully below, embodiments of the present invention can achieve a variety of desirable advantages and features. For example, embodiments of the present invention may be readily formed into trays or other shaped articles that may be used in both conventional and microwave ovens. Likewise, embodiments of the present invention provide coated sheet material that is resistant to penetration by grease and oil, and that is also resistant to penetration by water moisture. Accordingly, embodiments of the present invention can be useful as ovenable containers. Embodiments of the present invention may also provide an ovenable, coated sheet material that is readily biodegradable, as well as recyclable and repulpable. Superior browning of baked goods can be achieved with the use of embodiments of the present invention. Embodiments of the present invention also can provide a coated sheet material that is readily gluable with an appropriate glue or adhesive to form a shaped article such as a tray.

BRIEF DESCRIPTION OF THE DRAWINGS

The present invention is described more fully in the following detailed description of embodiments taken in conjunction with the drawings wherein:

FIG. 4 represents a flow diagram showing a manufacturing protocol for preparing a coated sheet material embodying the present invention.

FIG. 5 represents a flow diagram showing another manufacturing protocol for preparing a coated sheet material embodying the present invention.

DETAILED DESCRIPTION OF THE INVENTION

There has now been discovered a novel coated substrate sheet material, suitable for use in conjunction with food products, embodiments of which can be dual-ovenable and relatively biodegradable and which can provide good food release characteristics, good food browning, superior oil and grease resistance, superior water moisture resistance, and good gluability with an appropriate glue. In its preferred form, the coated substrate sheet material is comprised of a porous substrate sheet material; a barrier coating, or layer, comprised of (i) a cross-linkable polymer resistant to water moisture, and (ii) a grease-resistant, water-resistant, water-dispersible, film-forming polymer; and a release coating, or layer. The barrier coating may also include fillers, such as clays; pigments, such as titanium dioxide; dyes, such as food coloring dyes, and suspending or dispersing agents, such as tetrasodium pyrophosphate. For strength and stability, as well as its low cost relative to other possible substrates, one preferred substrate sheet material for use in ovenable trays embodying the present invention is E-fluted corrugated paperboard having, for example, outer plies of 33 lbs. per 1000 square feet (for each outer ply), and an internal ply of 26 lbs. per 1000 square feet.

Figure 1:
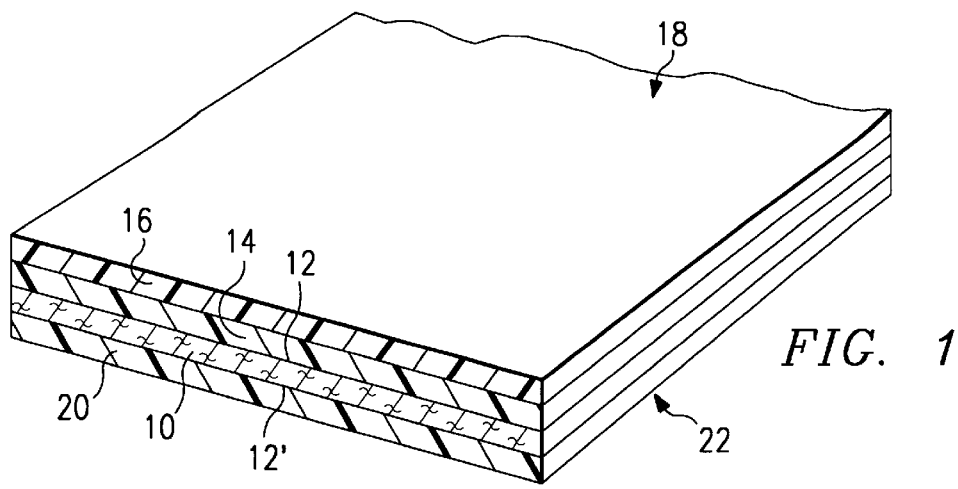
FIG. 1 represents a cross-sectional, perspective view of a coated sheet material embodying the present invention.

With reference to FIG. 1, in the preferred operation, a porous substrate sheet material 10 having oppositely disposed surfaces 12 and 12' is first coated on a surface 12 with a barrier coating 14 made from a barrier coating composition. The barrier coating composition may be applied, as a solution or dispersion, by roll coater, brush, doctor blade or blade coater, sprayer or other such suitable application means; however, in the manufacturing context, it will presumably be preferable to use a commercial roll coater of some sort, such as an engraved roll coater or a reverse roll coater. When the barrier coating used is sufficiently thick, then a coating-transfer processes may be used. The barrier coating composition is applied in sufficient amount so as to provide the level of performance desired. Preferably, it is applied at a rate of about 0.5–10 lbs. per 1000 square feet, more preferably at a rate of about 2–7 lbs. per 1000 square feet of substrate, and most preferably at a rate of about 5–6 lbs. per 1000 square feet. The amount of barrier coating composition applied may vary widely according to the substrate used and its characteristics, such as porosity and surface roughness, as well as the rheological characteristics of the coating composition, such as viscosity. The sheet material 10 with barrier coating 14 is then allowed to dry and cure.

After drying, the substrate sheet material 10 with barrier coating 14 is coated with the release coating 16. The release coating 16, like the barrier coating 14, may be applied, as a solution or dispersion, by roll coater, dipping, brush, doctor blade or blade coater, sprayer or other such suitable application means; however, in the manufacturing context, it will presumably be preferable to use a commercial roll coater of some sort, such as an engraved roll coater or a reverse roll coater. The release coating 16 is preferably applied at a rate of about 0.2–3 lbs. per 1000 square feet, and most preferably at about 1–2 lbs. per 1000 square feet. However, the amount applied may vary widely according to the type of release coating composition used, the type of substrate used, the type of barrier coating composition used, and other such variables. There must be enough release coating 16 to prevent food from sticking to the sheet material when used as an ovenable container or a food wrapper. After application of the release coating 16, the coated sheet material with release coating is then allowed to dry and cure. The release coating 16 will form the food-contacting surface 18 of the coated sheet material when it is formed into a tray 30, as depicted in FIGS. 2 and 3.

An optional heat-shielding coating 20 of a polymeric composition may be applied to the other surface 12' of the substrate sheet material 10 when the coated material is to be used in making an ovenable article. In such a case, the polymeric composition that forms the heat-shielding coating 20 may be applied before or after the barrier coating 14 is applied to the oppositely disposed surface 12, and preferably is applied concurrently with the application of the release coating of 16 so as to provide a two-step coating process. The heat-shielding coating 20 protects the surface 12' of the substrate sheet material 10 from oven heat during cooking. Any of a variety of polymeric compositions may be used for the heat-shielding coating 20, including, for example, PVA, acrylic resins, styrene-butadiene resins, mixtures and copolymers of the foregoing, and the like. The heat-shielding coating, it may be noted, is not always necessary to prevent destruction of or damage to the sheet material by heat, but helps to guard against this possibility. Furthermore, if a pigmented substrate sheet material is used, the heat-shielding coating prevents discoloration of the sheet material during cooking. Moreover, the heat-shielding coating may itself be pigmented to add to the aesthetic appearance of the substrate sheet material, particularly if the substrate sheet material is brown Kraft paper.

Figure 2:
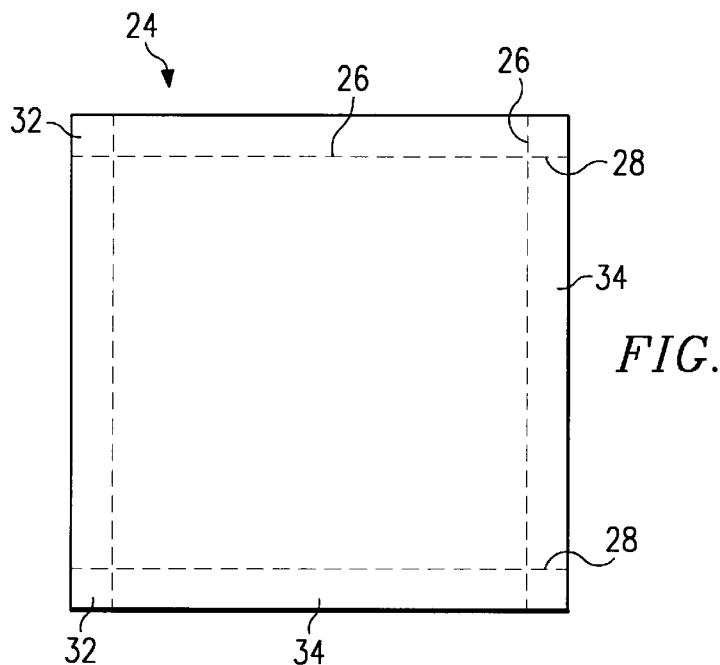
FIG. 2 represents a layout type of view of a coated sheet material embodying the present invention formed as a blank for constructing a tray, but prior to folding and adhering together portions to form a tray.
Figure 3:
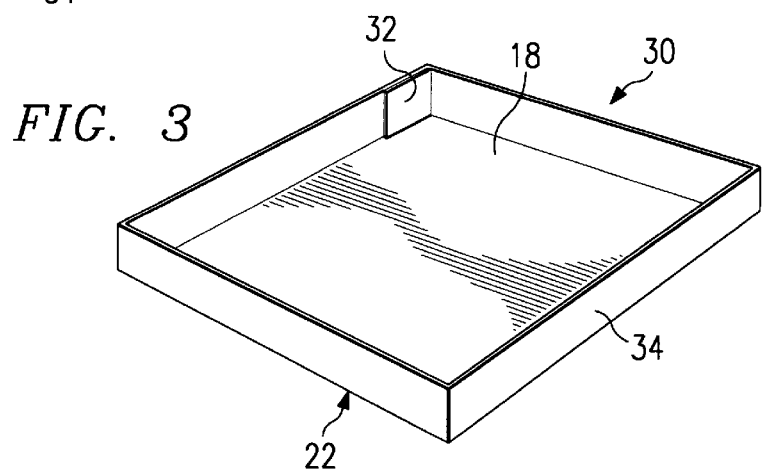
FIG. 3 represents a perspective view of a tray embodying the present invention formed from a coated sheet material as depicted in FIG. 1.

With reference to FIG. 2, the numeral 24 denotes generally the blank formed from the coated sheet material from which a shaped article, such as a tray, may be fashioned. The blank 24 has been scored, but not cut, along fold lines 26. The blank 24 has been cut along lines 28. The blank 24 may be folded along lines 26 to form the tray 30 depicted in FIG. 3. Fold panels 32 may be secured to sidewalls 34 by applying adhesive or glue between them. The adhesive or glue used should contain a wetting agent to permit the adhesive or glue to penetrate the release coating 16 on the coated sheet material. As shown in FIG. 3, the release coated surface forms the food-contacting surface 18 of the tray 30, while the heat-shielding coating is on non-food-contacting surface 22.

The coated sheet material may be formed into a shaped article by means other than folding and gluing, such as, for example, by pressure-forming. Such shaped articles may, but need not, be used for cooking or baking purposes. For example, the coated sheet material may be used to make a container (which, as such term is used herein, refers to any form of container of any size or shape, and regardless of whether such container fully encloses or only partially encloses an item placed therein) for storing food on a shelf (such as for storing pet food) while preventing penetration of grease, oil and/or water through the sheet material. Or the coated sheet material may be used to form a container such as a baking tray, as depicted in FIG. 3. Likewise, the coated sheet material may be used to form a food receptacle (which, as such term is used herein, refers to any surface for receiving or placing food), such as a paper plate. Or the coated sheet material may be used for fast-food containers, such as boxes for fried chicken, or food wrappers, such as wrapping materials for hamburgers and sandwiches. Thus, the coated sheet material may be used for any of a variety of applications as a food container, wrapper or receptacle.

One aspect of this invention relates to substrate sheet materials. Such substrate sheet materials are preferably porous, and therefore not impervious to water and oil, and may vary widely. These include substrates comprised of non-woven and woven polymers such as fabrics, porous clays such as clay baking containers, and cellulose-based materials, such as paper and cardboard substrates, and the like. One preferred embodiment of the present invention comprises a porous sheet material made of a cellulosic material, or a cellulose-based material, such as paper or paper-like materials. Such paper sheet materials include, for example, corrugated paperboard (or "cardboard"), newsprint paper, uncorrugated Kraft paper stock, pan liner paper stock, and the like. In addition to paper and paper-like materials, other cellulose-based sheet materials, such as pressed board, may also be suitable. It is also possible to use other fibrous materials for the substrate sheet material. In significant part, the choice of substrate will depend on economic concerns— low cost substrates being preferred in this regard—and the intended use of the coated sheet material. When the coated sheet material is to be used for a self-supporting baking tray, a stronger and more dimensionally stable substrate (such as corrugated paperboard) may be preferred. When the coated sheet material is to be used for a food wrapper (such as a wrapping material for a hamburger), less dimensionally stable sheet materials may be suitable.

In one particularly preferred embodiment for use in making a baking tray, an E-fluted corrugated paperboard having three plies of Kraft paper is used for the substrate sheet material. Such E-fluted corrugated paperboard is commonly referred to as "cardboard" and may be obtained, for example, from Willamette Industries. Without being bound by the following theory, it is believed that such corrugated paper, having air space in the interior flutes, enhances the even distribution of heat over the tray surface and enhances browning. For ovenable product embodiments of the present invention, corrugated paperboard having outer plies of between about 10 and 40 lbs. per 1000 square feet for each outer ply are suitable, and corrugated paperboard having outer plies of between 20 and 40 lbs. per 1000 square feet (for each outer ply) are preferred. For example, for such ovenable product embodiments, corrugated paperboard having outer plies of about 33 lbs. per 1000 square feet (for each outer ply) and about 26 lbs. per square feet for the inner ply has been found to be suitable.

Another aspect of this invention relates to a barrier coating composition for the coated sheet material. The barrier coatings of the present invention comprise (i) a crosslinkable polymer resistant to moisture, and (ii) a grease resistant, water resistant, water dispersible, film-forming polymer. Such cross-linkable polymer is preferably applied to the substrate sheet material as part of a solution or dispersion. Crosslinkable resins are preferred in order to resist penetration by water moisture into the substrate sheet material at elevated temperatures. One preferred class of crosslinkable resins includes acrylic resins. Preferred crosslinkable acrylic resins include Michem® coat 50A, made by Michelman, Inc., and Rhoplex® P-376 and Rhoplex® B-15, made by Rohm and Haas. In addition, styrene-butadiene resins ("SBR") have been found to function suitably as cross-linkable polymers in the barrier coating composition, including such SBR's as Michem® coat 50H, made my Michelman, Inc., and Latex PB 6692NA made by Dow Chemical. Blends and/or copolymers of cross-linkable polymers may also be used. Other cross-linkable polymers, such as polyvinyl alcohols, polyurethane polymers, polyamine polyamide epichlorohydrin resins and various fluorochemical polymers (e.g., Zonyl® 7040 made by Du Pont), may also provide the necessary barrier properties, although it may be that such polymers are not approved under FDA regulations or other appropriate regulations relating to food contact. For purposes of using the ovenable coated sheet material for containers for cooking food, the cross-linkable polymer and other components of the coated sheet material may, of course, be subject to a variety of federal, state and other governmental regulations, such as regulation by the FDA. In this regard, in connection with food containers or wrappers, the cross-linkable polymer and other components of the coated sheet material must be non-toxic as used therein and should lack undesirable odors that could be imparted to the food.

The cross-linkable polymer preferably has a molecular weight, before curing, of greater than about 5,000. After curing, when the cross-linkable polymer is cross-linked (i.e., when monomer or comonomer repeat units are cross-linked to other monomer or comonomer repeat units in the polymer), the molecular weight of the polymer may be about 20,000 to 40,000 or greater. The cross-linkable polymer, after curing, preferably cross-links to an extent so as to provide the desired water moisture barrier properties. Preferably, the degree of cross-linking is between about 0.5% and about 4%, and more preferably between about 0.5% and about 2%, as expressed by the average weight percent of monomer or comonomer repeat units in the polymer that are cross-linked. A more specific listing of polymers that may be used as cross-linkable polymers resistant to water moisture in the barrier coating composition includes but is not limited to: polymers and copolymers of poly(dienes) such as poly(butadiene), poly(isoprene), and poly(1-pentenylene);

polyacrylics and polyacrylic acids such as poly(benzyl acrylate), poly(butyl acrylate)(s), poly(2-cyanobutyl acrylate), poly(2-ethoxyethyl acrylate), poly(ethyl acrylate), poly(2-ethylhexyl acrylate), poly(fluoromethyl acrylate), poly(5,5,6,6,7,7,7-heptafluoro-3-oxaheptyl acrylate), poly (heptafluoro-2-propyl acrylate), poly(heptyl acrylate), poly (hexyl acrylate), poly(isobornyl acrylate), poly(isopropyl acrylate), poly(3-methoxybutyl acrylate), poly(methyl acrylate), poly(nonyl acrylate), poly(octyl acrylate), poly (propyl acrylate), poly(p-tolyl acrylate), poly(acrylic acid) and derivatives and salts thereof;

polyacrylamides such as poly(acrylamide), poly(N-butylacrylamide), poly(N, N-dibutylacrylamide), poly(N-dodecylacrylamide), and poly(morpholylacrylamide);

polymethacrylic acids and poly(methacrylic acid esters) such as poly(benzyl methacrylate), poly(octyl methacrylate), poly(butyl methacrylate), poly(2-chloroethyl methacrylate), poly(2-cyanoethyl methacrylate), poly(dodecyl methacrylate), poly(2-ethylhexyl methacrylate), poly(ethyl methacrylate), poly(1,1,1-trifluoro-2-propyl methacrylate), poly(hexyl methacrylate), poly(2-hydroxyethyl methacrylate), poly(2-hydroxypropyl methacrylate), poly(isopropyl methacrylate), poly(methacrylic acid), poly(methyl methacrylate) in various forms such as, atactic, isotactic, syndiotactic, and heterotactic; and poly(propyl methacrylate);

polymethacrylamides such as poly(4-carboxyphenylmethacrylamide);

other alpha- and beta-substituted poly(acrylics) and poly(methacrylics) such as poly(butyl chloracrylate), poly(ethyl ethoxycarbonylmethacrylate), poly(methyl fluoroacrylate), and poly(methyl phenylacrylate);

polyvinyl ethers such as poly(butoxyethylene), poly(ethoxyethylene), poly-(ethylthioethylene), poly(dodecafluorobutoxyethylene), poly(2,2,2-trifluoroethoxytrifluoro-ethylene), poly(hexyloxyethylene), poly(methoxyethylene), and poly(2-methoxypropylene);

polyvinyl halides and poly(vinyl nitriles) such as poly(acrylonitrile), poly(1,1-dichloroethylene), poly(chlorotrifluoroethylene), poly(1,1-dichloro-2-fluoroethylene), poly(1-difluoroethylene), poly(methacrylonitrile), poly(vinyl chloride), and poly(vinylidene chloride);

polyvinyl esters such as poly(vinyl acetate), poly(benzoyloxyethylene), poly(4-butyryloxybenxoyloxyethylene), poly(4-ethylbenzoyloxyethylene), poly[(trifluoroacetoxy)-ethylene], poly[(heptafluorobutyryloxy)ethylene], poly(formyloxyethylene), poly[(2-methoxy-benzoyloxy)ethylene], poly(pivaloyloxyethylene), and poly(propionyloxyethylene); and hydrolyzed or partially hydrolyzed versions thereof, such as poly(hydroxyethylene-co-acetoxy ethylene), poly(hydroxyethylene-co-formyloxyethylene), poly(vinyl alcohol), and the like;

other vinyl polymers, such as poly(vinylpyrrolidone) and the like;

hydroxyl containing polymers, such as poly(butylene alcohol), poly(propylene alcohol), poly(vinyl alcohol), poly(hydroxyethylene acrylate), and the like;

polystyrenes such as, poly(4-acetylstyrene), poly[3-(4-biphenylyl)styrene], poly(4-[(2- butoxyethoxy)methyl]styrene), poly(4-butoxymethylstyrene), poly(4-butoxystyrene), poly(4-butylstyrene), poly(4-chloro-2-methylstyrene), poly(2-chlorostyrene), poly(2,4-dichlorostyrene), poly(2-ethoxymethylstyrene), poly(4-ethoxystyrene), poly(3-ethylstyrene), poly(4-fluorostyrene), poly(perfluorostyrene), poly(4-hexylstyrene), poly[4-(2-hydroxyethoxymethyl)styrene], poly[4-(1-hydroxy-1-methylpropyl)styrene], poly(2-methoxymethylstyrene), poly(2-methoxystyrene), poly(alpha-methylstyrene), poly(2-methylstyrene), poly(4-methoxystyrene), poly(4-octanoylstyrene), poly(4-phenoxystyrene), poly(4-phenylstyrene), poly(4-propoxystyrene), and poly(styrene);

polyoxides such as poly(ethylene oxides), poly(tetrahydrofuran), poly(oxetanes), poly(oxybutadiene), poly[(oxychloromethyl)ethylene], poly(oxy-2-hydroxytrimethyleneoxy-1,4-phenylenemethylene-1,4-phenylene), poly(oxy-2,6-dimethoxy-1,4-phenylene), and poly(oxy-1,3-phenylene);

polycarbonates such as polycarbonate of Bisphenol A, and poly([oxycarbonyloxy-4,6-dimethyl]-1,2-phenylenemethylene-3, 5-dimethyl-1,2-phenylene);

polyesters such as poly(ethylene terephthalate), poly[(1, 2-diethoxycarbonyl)ethylene], poly[(1,2-dimethoxycarbonyl)ethylene], poly(oxy-2-butenyleneoxysebacoyl), poly[di-(oxyethylene) oxyadipoyl], poly(oxyethyleneoxycarbonyl-1,4-cyclohexylenecarbonyl), poly-(oxyethyleneoxyisophthaloyl), poly[di(oxyethylene) oxyoxalyl], poly[di(oxyethylene)oxysuccinyl], poly(oxyethyleneoxyterephthaloyl), poly(oxy-1,4-phenyleneisopropylidene-1,4-phenyleneoxysebacoyl), and poly(oxy-1,3-phenyleneoxyisophthaloyl);

polyanhydrides such as poly(oxycarbonyl-1,4-phenylenemethylene-1, 4-phenylene-carbonyl), poly(oxyisophthaloyl), poly(maleic anhydride), copolymers and hydrolyzed versions thereof;

polyurethanes such as poly(oxcarbonyliminohexamethylene-iminocarbonyloxydecamethylene), poly(oxyethyleneoxycarbonyliminiohexamethyleneiminocarbonyl), poly(oxyethyleneoxycarbonylimino-1,4-phenylenetrimethylene-1, 4-phenyleneiminocarbonyl), poly(oxydodecamethyleneoxycarbonyliminodecamethyl eneiminocarbonyl), and poly(oxytetramethylene-oxycarbonylimino-1, 4-phenylenemethylene-1,4-phenyleneiminocarbonyl);

polysiloxanes such as, poly(dimethylsiloxane), poly[oxy(methyl) phenylsilylene], and poly(oxydiphenylsilylene-1, 3-phenylene);

polysulfones and poly(sulfonamides) such as poly[oxycarbonyldi(oxy-1,4-phenylene)sulfonyl-1,4-phenyleneoxy-1, 4-phenylene], poly(oxy-1,4-phenylenesulfinyl-1, 4-phenyleneoxy-1,4-phenylenecarbonyl-1, 4-phenylene), poly(oxy-1,4-phenylenesulfonyl-1,4-phenylene), and poly(sulfonyl-1,3-cyclohexylene);

polyamides such as nylon-6, nylon-6,6, nylon-3, nylon-4,6, nylon-5,6,nylon-6,2, nylon-6,12, nylon-12, and poly(vinyl pyrrolidone);

polyimines such as poly(acetyliminoethylene), poly ethylenimine and poly(valeryl-iminoethylene);

polybenzimidazoles such as poly(2,6-benzimidazolediyl-6, 2-benzimidazolediyloctamethylene);

carbohydrates such as starches, amylose triacetate, cellulose triacetate, cellulose tridecanoate, ethyl cellulose methylcellulose, carboxymethylcellulose, hydroxyethylcellulose, and the like;

and polymer mixtures and copolymers thereof such as poly(acrylonitrile-co-styrene) with poly(e-caprolactone), or poly(ethyl methacrylate), or poly(methyl methacrylate);

Poly(acrylonitrile-co-vinylidene chloride) with poly(hexamethylene terephthalate);

Poly(allyl alcohol-co-styrene) with poly(butylene adipate), or poly(butylene sebacate); poly(n-amyl methacrylate) with poly(vinyl chloride);

bisphenol A polycarbonate with poly(e-caprolactone), or poly(ethylene adipate), or poly(ethylene terephthalate), or novolac resin;

poly(butadiene) with poly(isoprene);

poly(butadiene-co-styrene) with glycerol ester of hydrogenated rosin;

poly(butyl acrylate) with poly(chlorinated ethylene), or poly(vinyl chloride);

poly(butyl acrylate-co-methyl methacrylate) with poly(vinyl chloride);

poly(butyl methacrylate) with poly(vinyl chloride);

poly(butylene terephthalate) with poly(ethylene terephthalate), or poly(vinyl acetate-co-vinylidene chloride);

poly(e-caprolactone) with poly(chlorostyrene), or poly(vinyl acetate-co-vinylidene chloride);

cellulose acetate with poly(vinylidene chloride-co-styrene);

cellulose acetate-butyrate with poly(ethylene-co-vinyl acetate);

poly(chlorinated ethylene) with poly(methyl methacrylate);

poly(chlorinated vinyl chloride) with poly(n-butyl methacrylate), or poly(ethyl methacrylate), or poly(valerolactone);

poly(chloroprene) with poly(ethylene-co-methyl acrylate);

poly(2,6-dimethyl-1,4-phenylene oxide) with poly(a-methylstyrene-co-styrene), or poly(styrene);

poly(ethyl acrylate) with poly(vinyl chloride-co-vinylidene chloride), or poly(vinyl chloride);

poly(ethyl methacrylate) with poly(vinyl chloride);

poly(ethylene oxide) with poly(methyl methacrylate);

poly(styrene) with poly(vinyl methyl ether); and poly(valerolactone) with poly(vinyl acetate-co-vinylidene chloride);

maleic anhydride copolymers, such as poly(maleic anhydride-co-ethylene), poly(maleic anhydride-co-styrene), and the like.

In connection with the cross-linkable polymer resistant to penetration by water moisture, it may be beneficial to enhance and expedite cross-linking by any suitable means, such as by heat, UV or visible light radiation, or by the use of high energy radiation, such as gamma rays, x-rays, or electron beams, or exposure to air, or by corona discharge, or by addition of a cross-linking agent. Heating the barrier coating composition after application thereof will generally speed up the cross-linking process. The addition of a cross-linking agent may enhance the degree of cross-linking achieved by the polymer and may thereby enhance the ovenability of the barrier coating, particularly as used in conventional ovens. As an example, with an acrylic resin, it may be useful to add an ammonium zirconium carbonate cross-linking agent to the acrylic resin before mixing the acrylic resin with other components of the barrier coating, described more fully below. In addition, when such a cross-linking agent is used with an acrylic resin, it may also be beneficial to add a small amount of an SBR to provide flexibility in the coating and prevent cracking thereof if the coated sheet material is folded to make a shaped article. With hydroxy containing barrier polymers, cross-linking agents such as glyoxal, ethyl oxylate, and the like may be useful. Other crosslinking agents that have been found to be useful are polymers and copolymers containing anhydrides, such as Scriptset™ 720 and other 700 series Scriptset™ resins (Monsanto) that are copolymers of styrene and maleic anhydride, and the like. Other suitable crosslinking agents are polymers and copolymers containing epichorohydrin functionalities, such as Polycup™ 172 resins (Hercules, Inc.) which is a water soluble polyamine-polyamide-epichlorohydrin material, and the like. Also useful as crosslinking agents are compositions containing high valent metal ions, such as iron (+3), titanium (+4), chromium (+3), and the like. Thus, Quilon® (DuPont) formulations containing chromium (+3) complexes of fatty acids are suitable crosslinking agents.

Another aspect of this invention relates to the water-dispersible, film-forming polymer in the barrier coating composition. The term "water-dispersible," as used herein is intended to include water-soluble compounds, as well as compounds that may be dispersed in or borne by an aqueous mixture (i.e., "water-borne") even though the compound is not actually soluble in water. The water-dispersible, film-forming polymer is generally applied to the substrate sheet material as part of a solution or dispersion including the cross-linkable polymer resistant to water moisture, although the two polymers need not be applied as part of a single solution or dispersion. Preferred for use in the practice of the present invention are water dispersible polymers comprised of hydroxylated polymers, such as polyvinyl alcohols (PVAs). In certain cases, hydroxylated polymers can be used both as the cross-linkable polymer and the water-disversible film-forming polymer. Thus, poly(vinyl alcohol) with 0.5 to 15% cross-linking agent can be used to form a barrier coating composition. PVA crosslinked with the crosslinking agents of this invention provides for a flexible, formable, pin-hole free barrier coating layers that otherwise do not form using PVA alone. Other suitable water-dispersible, film-forming polymers include poly(butylene alcohol), poly(propylene alcohol), polyvinyl acetate, poly(hydroxyethyl acrylate), hydroxyethylcellulose, carboxymethylcellulose, poly(vinyl pyrrolidone), and copolymers of any of the foregoing, and other like water-dispersible polymers. The water-dispersible, film-forming polymer, by forming a relatively continuous film over the porous substrate, serves to resist penetration by grease and oil into the substrate sheet material and, furthermore, binds to the release coating. Of course, for use in connection with food, the water-dispersible, film-forming polymer should also be non-toxic and should lack undesirable characteristics such as an unpleasant odor. It should meet appropriate federal, state and other government regulations.

The ratio of water-dispersible, film-forming polymer to cross-linkable polymer in the barrier coating composition, by weight of the solids of such polymers, can vary widely but is preferably between about 0.25:1 and about 1:1, particularly when PVA is the water-dispersible film-forming polymer and an acrylic resin is the cross-linkable polymer. The most preferred ratio, by weight solids, of PVA to acrylic resin is about 0.67:1. Without being bound by the following theory, it is believed that the ratio of water-dispersible, film-forming polymer to cross-linkable polymer can contribute to the degree of food-browning obtained when the coated sheet material is used, for example, in an ovenable baking tray. In general, it has been observed that greater degrees of browning are achieved with higher ratios of water-dispersible, film-forming polymer to cross-linkable polymer.

The barrier coating composition may also preferably contain a small amount of filler. For example, commercially available clay fillers have been found to be suitable for use in the barrier coating. The filler gives the coating the desired consistency and, it is believed, helps maintain the barrier coating on the surface of the substrate sheet material, thus optimizing the grease, oil and water resistance properties of the sheet material. Appropriate fillers may also enhance the inherent barrier properties of the barrier coating composition. Without being bound by the following theory, it may be that the filler helps bridge pores and voids in the substrate and thereby helps prevent seepage of the barrier coating into the substrate. Preferred clay filler materials for the barrier coating include, for example, Kaomer 350™ clay (made by Dry Branch Kaolin Company) and Kaopeque 10™ (also made by Dry Branch Kaolin Company). Other filler materials, such as calcium carbonate (e.g., precipitated calcium carbonate made by Pfizer Inc.), metal flakes, micas, silicas and the like may also be used.

Pigments and dyes may be added to the barrier coating composition to give the surface of the coated sheet material a desired appearance. For example, it may be desired that the food-contacting surface of the coated sheet material be a white color. If brown Kraft paper is used as the substrate sheet material, titanium dioxide may be added to the barrier coating composition to make it white and to make the food-containing surface of the sheet material appear white when the barrier coating composition is applied. It has been found that pigments such as Ti-Pure® R-900, a titanium dioxide pigment made by DuPont, are suitable pigments for the barrier coating. Other pigments may be suitable so long as they do not significantly degrade the performance of the barrier coating composition. Dyes may be added, such as food dyes, to give desired color or appearance to coated substrates.

In addition, a dispersing agent may be added to the barrier coating composition to help disperse and suspend the filler and pigment particles in the coating before application, and to stabilize the suspension. Any of a variety of dispersing agents may be used. For example, it has been found that dispersing agents such as tetrasodium pyrophosphate ("TSPP") and sodium hexametaphosphate are suitable for this purpose.

Another aspect of this invention relates to a release coating. The nature of the release coating may vary widely, and is preferably used to inhibit sticking of food material to the surface of the coated sheet material. The release coating composition is preferably comprised of a metal complex of a fatty acid, such as Quilon®. Quilon® is a Werner chrome complex of a fatty acid and is manufactured by DuPont. Quilon® L has been found to be particularly suitable. Other suitable release coating materials include, for example, iron(+3)-fatty acid complexes and titanium(+4)-fatty acid complexes. It has been found that best results are achieved with a trivalent or tetravalent metal complex of a fatty acid, such as those mentioned above.

When such metal complexes of fatty acids are coated onto the barrier coating, it appears that the positively-charged metal ion portion of the metal complex binds to negatively-charged sites in the water-dispersible, film-forming polymer. The formula for such metal complexes may generally be described as: $M^{+n} (RCO_2)_y$ wherein M is a metal ion, such as iron, titanium, chromium, vanadium, etc.; n is an integer equal to or greater than 3; R is an alkyl chain having from 6 to 30 carbon atoms; and y is a integer equal to or greater than 1.

It may be desirable to add a minor amount of fine metal powder, such as aluminum powder, or metal flakes, such as aluminum flake, or apply a light metal coating, such as an aluminum or other metallized layer to the barrier coating composition or release coating composition to provide and aesthetically pleasing appearance, such as a metallic reflectance, or to function as a susceptor material, or as a heat shield or IR reflectance material. Such metallized layer material may enhance browning and crisping of foodstuffs that are cooked on the coated sheet material in a microwave oven. Susceptors generally allow for browning or crisping in microwave ovens by heating up when exposed to microwave energy, and transferring such heat to the foodstuff resting on or adjacent to the susceptor. However, too much susceptor material should be avoided because an excess of susceptor material will cause arcing in a microwave oven.

Another aspect of the present invention relates to a process for making coated sheet materials of the present invention, and articles derived therefrom. In the manufacturing context, when corrugated paper is to be used as the substrate sheet material, it may be useful to apply the barrier coating composition and the release coating composition to Kraft paper prior to incorporating the Kraft paper into a corrugated sheet. For example, as shown in the flow diagram set forth in FIG. 4, Kraft-processed paper manufactured at a paper mill may be prepared in rolled stock of 33 lbs. per 1000 square feet (step C). A barrier coating composition (steps A and B) pigmented white, as described above, may be applied to one surface of the rolled brown stock by roll coating at the paper mill (step D), thereby creating a Kraft paper rolled stock with barrier coating on one side. This coated stock may be shipped to a corrugator, and there, the release coating composition may be applied to the barrier coating on the rolled stock (steps E and F). A separate roll stock of Kraft paper may be coated on one surface with a heat-shielding polymeric composition (steps G and H).

The roll stocks may then be used to manufacture corrugated Kraft paper having one outer ply with a barrier coating and release coating on one outside surface of the corrugated structure, and one outer ply with a heat-shielding coating on the other outside surface of the corrugated structure (step I). The release coating and heat-shielding coating are preferably applied concurrently, so that only a two step coating process is required. The inner ply may be, for example, a sheet of Kraft paper of 26 lbs. per 1000 square feet. The coated corrugated sheet material so prepared may then be sent to a die-cutter to cut into shapes of desired form (step J), then formed into a shaped article, such as a tray (step K).

While the manufacturing process described in the flow diagram of FIG. 4 may be preferred for manufacturing coated sheet material embodiments of the present invention, said process is by no means the only process that may be used for manufacturing coated sheet materials of the present invention. For example, as described in the flow diagram in FIG. 5, a barrier coating composition (steps a and b) (referred to in FIG. 5 as the "GR coating") may be applied to a cellulose-based sheet material roll stock manufactured at a paper mill (step c) in a coating operation (step d), followed by coating (step f) with the release coating composition (prepared in step e) and then die-cutting the coated sheet material (step g).

Another example of a manufacturing process which may be useful in applying the various compositions of the instant invention includes a coating-transfer technique or lamination process. This coating-transfer process may comprise first casting (such as solvent casting) the film-forming barrier coating on to a substantially non-porous and non-adherent surface of a flexible carrier, partially curing or fully curing the barrier coating on the surface of the carrier, and transferring the coating from the carrier onto a surface of the desired porous substrate material. Various embodiments of the coating transfer process within the scope of this invention are possible.

Advantages of such a coating-transfer process include: the ability to use a wide variety of substrate materials with widely varying pore sizes, conservation of the material required to coat porous substrates; the ability to print onto the surface of the coating which is to be laminated to the porous substrate for producing a finer print than that which is available by printing directly onto the porous substrate; the ability to incorporate an aesthetically attractive surface, such as that obtained by metallization, metal coating, dying, coloring, etc., onto the surface of a substrate which is otherwise substandard in aesthetic appearance; and the ability to transfer a high gloss or texture on the coated surface of the flexible carrier onto the porous substrate via the formed and transferred film.

Since the barrier coating of the present invention can be formed into a cured coating before it contacts the porous substrate, there is significant reduction in the amount of said coating material required to sufficiently cover the substrate, and which would otherwise be soaked into the pores of the substrate. Printing on the coating before the coating is transferred onto the substrate likewise conserves printing materials and inks. Such printing also allows for the creation of clearer and more crisp imagery to be placed onto the substrate, since the amount of "bleeding" by the inks into the pores of the substrate is thereby significantly reduced.

Also with the coating-transfer process, an aesthetically attractive film coating can be formed onto a flexible carrier, rolled up with the flexible carrier in a form suitable for shipping, shipped to a location in which there is a supply of substrate material and simple laminating equipment, and thereat be laminated onto the face of the substrate material. This allows for the benefits of the present invention to be used by those who may lack either the equipment necessary to form and print film, or the quality of substrate material necessary to otherwise produce an aesthetically attractive package. Other processes are also possible.

Compared with prior attempts, the present invention represents a truly unique approach to designing ovenable or dual ovenable sheet materials, and shaped articles therefrom, having various desirable properties and being simple and economical in design and construction. As noted above, embodiments of the present invention achieve excellent release of foodstuffs from the cooking surface while resisting penetration of grease, oil and water into the sheet material. Embodiments of the present invention, moreover, may be made with strong, low-cost substrates, such as cardboard or newsprint, and can achieve good biodegradability, as well as recyclability and repulpability. The present invention also allows for excellent browning of baked goods. Furthermore, embodiments of the present invention as described are easily formable without loss of performance, thus allowing for ready construction of shaped articles. Furthermore, the barrier coatings of the present invention readily allow for the construction of shaped articles using appropriate glues or adhesives, and, hence, may dispense with the need for clip-lock designs or pressure-forming processes. Shaped articles embodying the present invention may be made for use in either conventional or microwave ovens, or, in view of the barrier properties exhibited by embodiments of the present invention, may be used in non-cooking applications as food wrappers, containers or receptacles. The present invention also allows for considerable process design flexibility. Barrier coatings of the present invention can be directly applied to suitable substrates or applied by coating-transfer techniques. With the latter process, the barrier coating can be altered to provide aesthetically pleasing surfaces in addition to providing the desired performance. Barrier coatings of this invention can be metallized to give metallic appearances, IR reflectance, and heat insulating properties, as well as function as microwave susceptor materials for the use of coated substrates of this invention in microwave ovens.

The following examples are offered illustratively:

EXAMPLE 1

A barrier coating composition of the following formulation was prepared:

| | |
|---|---|
| 50 g | polyvinyl alcohol solution (prepared by dissolving 1 part by weight DuPont Elvanol ® 71-30 in 10 parts by weight $H_2O$) |
| 30 g | Michem ® coat 50A acrylic resin, obtained from Michelman, Inc. (total solids content of approximately 34.5–35.5%) |
| 15 g | Kaomer 350 ™ clay, obtained from Kaolin Company |
| 15 g | Ti-Pure ® R-900 titanium dioxide, obtained from DuPont |
| 0.2 g | TSPP, from Monsanto |
| 10 g | $H_2O$ |

This barrier coating was prepared by first preparing the polyvinyl alcohol solution by mixing 1 part by weight Elvanol 71–30 (in powder form) in 10 parts by weight water and stirring until the Evanol 71–30 was wetted out. This PVA solution was then heated for about 13–14 minutes at 200° F. while stirring, and then allowed to cool to room temperature. Next, the Michem® 50A acrylic resin (which, as supplied by Michelman, Inc., was 50% solids) was diluted with water to about 34.5–35.5% solids. All of the ingredients of the barrier coating composition were then placed in an Oster® blender and mixed for about 1–2 minutes, until the composition was smooth and uniform. (The ratio of PVA to acrylic resin, by weight solids of each, was 0.43:1—i.e., (50 g PVA solution×9% solids) ÷(30 g acrylic resin×34.5% solids)=0.43.) The composition was then coated on a 7" by 5½" E-fluted corrugated paperboard having other plies of 33 lbs. per 1000 square feet (for each outer ply) and an inner ply of 26 lbs. per 1000 square feet, such paperboard being supplied by Willamette Industries. The coating composition was applied with a Michelman blade coater at an application rate of approximately 3 lbs. per 1000 square feet. The coated sheet material was then dried and cured for about 5 seconds in an oven at 400° F.

A release coating composition was prepared by dissolving 2 g Quilon® L chrome complex, obtained from Du Pont, in 98 g $H_2O$. The Quilon® solution was then neutralized with urea formic acid to a pH of about 3. The solution was allowed to sit at room temperature for thirty minutes, after which the pH had stabilized at about 3.4–4. The Quilon® solution was applied, with a Michelman blade coater, on the dried barrier coating at a rate of about 2 lbs. per 1000 square feet. The coated sheet material was then placed in an oven for about 5 seconds at about 350° F. to allow the release coating to dry and cure and to bind to the barrier coating.

To protect the backside of the paper tray from oven heating during cooking, the back surface of the sheet material (i.e., the non-food-contacting surface) was also coated with a polymeric composition. This composition was applied after application of the barrier coating composition and release coating composition to the oppositely-disposed food-contacting surface. The heat-shielding polymeric composition was comprised of the following formulation:

| | |
|---|---|
| 2.5 g | polyvinyl alcohol solution (Elvanol ® 71-30 diluted to 9% solids) |
| 1 g | Quilon ® L |
| 10 g | titanium dioxide |
| 2 g | lake yellow |
| 0.3 g | TSPP |
| 10 g | calcium carbonate |
| 25 g | $H_2O$ |

These ingredients were mixed for 1–2 minutes in an Oster® blender prior to application. The heat-shielding polymeric composition was applied at a rate of approximately 3 lbs. per 1000 square feet. The sheet material, coated with the heat-shielding polymeric composition, was then placed in an oven for about 5 seconds at 400° F. to dry and cure.

A tray was formed by scoring, cutting and folding the corners of the sheet material in the manner depicted in FIGS. 3 and 4, and applying an appropriate adhesive to the folds of the tray. The adhesive was Adhesive No. 5041.00 obtained from Timminco Universal Adhesives in Memphis, Tenn.; this adhesive included wetting agent "Aerosol OT™," which, it is believed, allowed penetration into the Quilon® release layer. Thus folded, the release layer formed the surface of the interior of the tray on which food would be placed.

The tray so formed was used to bake 10 Winn Dixie™ cinnamon rolls in a conventional oven for about 14 minutes and 400° F. After cooking, the pan was allowed to cool at room temperature (about 72° F.) for a period of about one hour. The rolls were removed by quickly turning the pan over and allowing the rolls to release from the surface. Release was 100%. The rolls exhibited excellent browning.

Resistance to grease, oil and water moisture was determined, after removing a cinnamon roll from the tray, by measuring the approximate percentage of the total area of the tray surface directly under the roll that was stained as a result of penetration by grease, oil or water moisture. Such measurements were taken for 10 cinnamon rolls, and, for each roll, the area of the roll surface touching the tray was 2"×2", or 4 square inches. A stained area of less than 10% of the total area was considered good, while a stained area of more than 20% was considered poor. The tray of this Example exhibited excellent grease, oil and water moisture resistance, showing no staining.

EXAMPLE 2

For comparative purposes, five trays were formed using different coating compositions, and two trays were formed using extruded, biaxially-oriented PET films. For all trays, a heat-shielding coating composition was applied as described in Example 1 to one surface of a paper substrate as in Example 1. Furthermore, for trays 1 through 4, the trays were formed from dual-ovenable sheet material prepared as in Example 1, except as follows. For tray 1, the barrier coating composition of Example 1, but without any PVA solution, was applied, and no release coating was used. For tray 2, the barrier coating composition of Example 1 was applied, and, again, no release coating was used. For tray 3, the barrier coating composition of Example 1, but without any PVA solution, was applied, followed by application of a release coating as described in Example 1. Tray 4 was made fully in accordance with Example 1. For tray 5, no barrier coating and no release coating were applied.

Trays 6 and 7 were made with extruded, biaxially-oriented PET films. For tray 6, a MYLAR™ PET film, without a silicone release layer, was glued to E-fluted corrugated paperboard of the type referred to in Example 1. For tray 7, a PET film laminate known and sold as "QRX™ paperboard," with a silicone release layer on the PET film, was used. All of the trays were used to bake Winn Dixie™ cinnamon rolls. The results are set forth in Table 1.

| Tray No. | Barrier | Release | % Release | Browning | Grease, H$_2$O Resistance | Glua-bility |
| --- | --- | --- | --- | --- | --- | --- |
| 1 | Acrylic | None | 0 | Poor | Poor | Pass |
| 2 | Acrylic & PVA | None | 0 | Fair | Good | Pass |
| 3 | Acrylic | Quilon ® | 50 | Poor | Good | Pass |
| 4 | Acrylic & PVA | Quilon ® | 100 | Excellent | Excellent | Pass |
| 5 | None | None | 0 | N/A | Poor | Pass |
| 6 | PET | None | 0 | Fair | Excellent | Fail |
| 7 | PET | Silicone | 50 | Fair | Excellent | Fail |

These results show that the release coating was necessary to obtain good release of the baked goods and good browning thereof. Furthermore, when the water-dispersible, film-forming polymer was excluded from the coating composition for trays 1–5, the coated sheet material failed with respect to release and browning characteristics and with respect to grease and water resistance. Furthermore, the embodiment of the present invention (tray 4) exhibited improved gluability as compared to commercially available PET laminate with silicone release coating, which failed with respect to gluability. When no release coating was used with the PET film, the PET film failed with respect to release characteristics.

EXAMPLE 3

A dual-ovenable tray was formed as in Example 1, except that in the barrier coating formulation, 30 g of Rhoplex® P-376 (an acrylic resin obtained from Rohm and Haas) was used instead of the Michem® coat 50A acrylic resin. Rhoplex® P-376 is a cross-linkable acrylic resin. The dual-ovenable tray of this Example exhibited excellent browning, excellent grease resistance, excellent water moisture resistance, and good gluability. All of the cinnamon rolls released when the tray was turned over.

EXAMPLE 4

A dual-ovenable tray was formed as in Example 1, except that in the barrier coating formulation, 30 g of Latex PB 6692NA (a styrene-butadiene resin ("SBR") obtained from Dow Chemical) was used instead of the Michem® coat 50A acrylic resin. Latex PB 6692NA is a cross-linkable SBR. The dual-ovenable tray of this Example exhibited excellent browning, excellent grease resistance, excellent water moisture resistance, and good gluability. All of the cinnamon rolls released when the tray was turned over. However, it was noted that, because there were portions of the interior tray surface exposed to air and not covered by a cinnamon roll, the SBR created an odor that would generally be undesirable for cooking purposes.

EXAMPLE 5

A dual-ovenable tray was formed as in Example 4. A Betty Crocker™ devil's food cake was baked in the tray at a temperature of about 350° F. for 30 minutes, the cake material filling substantially all of the tray so that almost no portion of the interior surface of the tray was exposed to air during baking. The tray exhibited excellent grease resistance, excellent water moisture resistance, and good gluability. The cake released easily when the tray was turned over and the cake pried gently with a knife. No unpleasant odor was generated by the SBR, apparently because almost no portions of the interior tray surface were exposed to air during baking.

EXAMPLE 6

Two dual-ovenable trays were formed as in Example 1, except that in the release layer formulation, an iron(+3)-fatty acid (stearic acid) complex was used for one tray, and a titanium(+4)-fatty acid (stearic acid) complex was used for the other tray. Although it is not known whether these metal-fatty acid complexes would meet FDA and/or other relevant federal or state regulations for cooking materials, the trays formed in this Example exhibited the same highly-acceptable performance in end-use performance tests as those of Examples 1, 3 and 4.

EXAMPLE 7

A barrier coating composition of the following formulation was prepared:

| | |
|---|---|
| 50 g | polyvinyl alcohol solution (prepared by dissolving 1 part by weight DuPont Elvanol ® 71-30 in 10 parts by weight $H_2O$) |
| 20 g | Rhoplex ® P-376 acrylic resin (total solids content of approximately 35%) |
| 1.5 g | Ammonium zirconium carbonate solution (Bacote ™ 20 obtained from Magnesium Elektron, Inc.) |
| 10 g | Kaopeque ™-10 |
| 15 g | Ti-Pure ® R-900-38 |
| 1 g | TSPP |
| 5 g | Styrene-butadiene resin (product no. X30560.50 from Dow Chemical) |

This barrier coating composition was prepared by first preparing the polyvinyl alcohol solution as described in Example 1. Next, the Rhoplex® P-376 acrylic resin (which, as supplied by Rohm & Haas, was approximately 50% solids) was diluted with water to about 35% solids. The ammonium zirconium carbonate—a cross-linking agent—was then added to the Rhoplex® P-376, and the Rhoplex® P-376 with cross-linking agent was allowed to sit for about twenty minutes. All of the above-listed ingredients of the barrier coating composition, except the styrene-butadiene resin ("SBR"), were then placed in an Oster™ blender and mixed for about 1–2 minutes, until the composition was smooth and uniform. At this time, the SBR was added and blended in gently by stirring by hand for about 3 seconds. The composition was coated on a 7" by 5½" E-fluted corrugated paperboard as described in Example 1, except that the coating was applied with a squeegee rather than a Michelman blade coater. The sheet material so coated was dried and cured for about 5 seconds in an oven at 400° F. A release coating composition was then prepared and applied as described in Example 1.

The coated sheet material was primarily tested for resistance to penetration by water by holding the coated sheet material at a 45° angle and, with an eyedropper, placing a drop of water on the surface of the coated sheet material. The drop of water ran down and off the coated sheet material without leaving a mark, which indicated that a sufficient amount of release coating composition and barrier coating composition had been used and coated evenly over the substrate sheet material. (If the drop of water leaves a mark or trace, it may indicate either an insufficient amount of barrier coating composition or release coating composition, or that either or both of such compositions are not evenly coated over the surface of the substrate sheet material.)

Two trays were formed from the coated sheet material in the manner described in Example 1. One tray so formed was used to bake 10 Winn Dixie™ cinnamon rolls in a conventional oven at 400° F. for about 14 minutes. The other tray was used to bake 10 Pillsbury™ cinnamon rolls at 400° F. for about 14 minutes. After baking, all of the rolls exhibited excellent browning. The trays formed in this Example exhibited superior performance in the end-use performance tests described in Example 1: 100% release, excellent browning, excellent grease and water resistance, and a passing grade on the gluability test. In the case of the Pillsbury™ cinnamon rolls, with tend to adhere more to baking pans than do the Winn Dixie™ cinnamon rolls, some of the rolls required gentle prodding with a fork to release from the tray, but no portions (or residues) of the rolls remained stuck to the tray.

EXAMPLE 8

A dual-ovenable tray was formed as in Example 1, except that no acrylic resin was added to the barrier coating composition. Rather, the following barrier coating composition was used:

| | |
|---|---|
| 50 g | polyvinyl alcohol solution (Evanol ® 71-30 diluted to 9% solids) |
| 15 g | Kaopeque ™-10 |
| 15 g | Ti-Pure ® R-900 |
| 1 g | TSPP |
| 10 g | $H_2O$ |

This barrier coating composition was prepared as in Example 1, except, as noted above, no acrylic resin was added to the composition. The barrier coating composition was coated on a sheet material as described in Example 1, and a release coating composition was also prepared and applied as described in that Example. No heat-shielding composition was used.

A tray formed from this coated sheet material was used to cook 10 Winn Dixie™ cinnamon rolls in a conventional oven at 400° F. for about 14 minutes. Another tray formed from this coated sheet material was used to bake a Betty Crocker™ devil's food cake at 350° F. for about 30 minutes. The tray with the cinnamon rolls did not exhibit good release characteristics; even after prodding with a fork, a residue of the rolls remained stuck to the tray. The tray with the cake exhibited satisfactory release characteristics. Both trays fared poorly in the test for water and grease resistance. Accordingly, this Example demonstrates the necessity of using, in the barrier coating, a cross-linkable polymer resistant to penetration by water moisture.

EXAMPLE 9

In this Example, a brightness meter was used to compare the browning characteristics of a tray embodying the present invention against the browning characteristics of pan liner paper, which was obtained from American Food Products. The pan liner paper was placed on the surface of a tray formed from uncoated corrugated paperboard as described as the substrate sheet material (before coating) in Example 1. Tray B of this Example as formed in accordance with Example 7. Six Winn Dixie™ cinnamon rolls were baked in each tray at 400° F. for about 14 minutes. The rolls were then removed from the trays and visually compared. The rolls from Tray B were distinctly more brown than the rolls from Tray A, which were generally light brown and almost white.

The brownness of the cinnamon rolls was further determined by measuring reflectance with a brightness meter with directional reflectance at 457 nm. The test was conducted in accordance With TAPPI test method T 452 om-87, which is generally used to measure the brightness of white, near-white and naturally-colored pulp, paper and paperboard. The test measures the percent of reflectance of magnesium oxide of 100.0%. Thus, a higher percent reflectance indicates higher whiteness. For each of the rolls, three brightness readings were taken (from different regions of the roll), and regions having cinnamon powder were avoided for the readings. The results were as follows:

|         | TRAY A ROLLS     | TRAY B ROLLS     |
|---------|------------------|------------------|
| Bun 1   | 27.3, 27.6, 38.5 | 17.8, 17.0, 19.2 |
| Bun 2   | 28.4, 35.6, 38.9 | 18.2, 28.9, 17.2 |
| Bun 3   | 34.0, 30.6, 26.5 | 23.0, 25.3, 27.6 |
| Bun 4   | 30.9, 31.3, 26.9 | 25.0, 24.7, 24.4 |
| Bun 5   | 26.3, 32.0, 31.4 | 30.0, 26.3, 21.2 |
| Bun 6   | 30.9, 31.0, 32.4 | 22.0, 23.2, 26.4 |
| AVERAGE | 31.1             | 23.2             |

The lower average reflections of the rolls from Tray B is indicative of the increased browning achieved with embodiments of the present invention as compared to pan liner paper.

EXAMPLE 10

In this Example, a tray formed as in Example 1 was tested for biodegradability against an extruded PET laminate tray, as described with respect to tray 7 in Example 2. The test for biodegradability was conducted by burying each tray approximately 1 foot deep in the ground, in close proximity to each other. The trays were dug up three months later. The tray of the present invention had completely degraded. In contrast, while the paperboard substrate of the PET laminate had degraded, the PET film of the PET laminate tray had not degraded at all.

EXAMPLE 11

In this Example, a tray formed as in Example 1 was tested for recyclability and repulpability. The test for recyclability and repulpability was conducted by tearing up the tray formed as in Example 1 in to pieces approximately 1"×1½". The torn pieces were placed in water and the pH was adjusted to about 10.5 at a water temperature of about 60° C. The torn-up coated sheet material comprised 1.2% by weight of the mixture. The mixture was placed in a TAPPI-standard T-205 disintegrator, which was run at 3000 r.p.m. for 50,000 revolutions. After disintegrating, the mixture was diluted until the pulp portion comprised 0.3% by weight. A hand sheet was then formed from the pulp. After forming, slight specks of coating were evident in the sheet, but no noticeable pieces of paper stock were visible.

EXAMPLE 12

This example demonstrates that PVA can be used as both the cross-linkable polymer resistant to penetration by water moisture when cured, and the water-dispersible film-forming polymer that is resistant to penetration by grease and oil when cured. It also demonstrates the ability to use the lowest grades of porous paper and turn them into highly glossed, multi-functional, non-porous papers.

A water solution of Airvol 125™ super hydrolyzed polyvinyl alcohol (PVA) containing 2.5% solids was cast onto a Mylar film to completely coat the surface. A #24 Myar Rod was then pulled across the coating to leave a uniform coating of the PVA solution on the Mylar film; the approximate coating rate was 7 lbs per 1000 sq.ft. The coating was uniform and even as evidenced by the lack of any "fish-eyes" (voids) in the coating. The coated Mylar film was then pulled across a hot surface (coated side up) (230° F.) for 30 seconds while exposed to ambient air. This caused the water in the coating to evaporate without distorting the Mylar film or the coating. A rainbow effect was evident from the coating. The observed dry weight of the uncoated Mylar film was 6.50 grams, the weight of the Mylar film with the wet coating was 9.68 g, and the final weight of the Mylar film with the dried, cured coating was 6.58 g. This cured coating was subjected to a water resistance test, an oil resistance test, and a wet rub test.

Water Resistance Test

A water drop was put onto the surface of the PVA coating on the Mylar film and the coating was observed through a magnifying lens. After 30 seconds, the water did not penetrate or swell the coating; after 1 minute the water did not penetrate or swell the coating; after 3 minutes at room temperature the water did not penetrate or swell the coating demonstrating that this cured PVA film exhibited good water resistance.

Oil Resistance Test

Vegetable oil was poured onto the coating on the Mylar film and observed through a magnifying lens. After three minutes at room temperature the oil did not penetrate or swell the coating demonstrating that this coating exhibited good oil resistance.

Wet Rub Test

A water drop was placed onto the coated surface of the Mylar film and allowed to sit for 1 minute at room temperature. A finger was placed on top of the water droplet and pressed down until contact with the PVA coating was made. The finger was then rubbed in a circular motion with mild pressure in the area where the water drop was sitting on the coating. In 10 seconds, the coating broke down demonstrating that the PVA coating exhibited poor wet rub characteristics.

Coating Transfer Process

The PVA coated Mylar film was then coated on top of the PVA layer with a vinyl acetate ethylene copolymer based tie layer (adhesive) made by Swift Adhesives (#48105) using a #7 Myar Rod. A piece of Kraft 100% virgin paper (69#stock, International Paper) was placed on top of the wet adhesive layer, and the composite structure was then run through high pressure lamination rollers, then through heated rollers (350° F.) with high pressure. The Mylar film side should come in contact with the heated roller to assist with releasing the PVA coating from the Mylar carrier. This heated lamination process contributes to setting the adhesive and forming a strong bond between the PVA coating and the paper. When the bond between the paper and the PVA coating is greater than the bond between the PVA and the Mylar carrier, the PVA coating will easily release from the Mylar carrier and be transferred to the paper substrate. This coated substrate was then subjected to a water resistance test, an oil resistance test and a wet rub test as described above. The water resistance test demonstrated that after 5 minutes, a water drop on the coating did not penetrate the barrier coating or cause it to shadow or swell. The oil resistance test demonstrated that vegetable oil did not penetrate the coating after 3 minutes of exposure. The wet rub test demonstrated that there was no break through of the coating even after 30 seconds of rubbing. This demonstrates significantly improved wet rub characteristics.

Release Coating Application

A release coating was applied on top of the exposed PVA coating on the paper substrate. The release coating was comprised of:

| |
|---|
| 32 g water |
| 4 g neutralizer |
| 4 g Quilon ® L |

This liquid coating formulation was then poured onto the PVA coated paper substrate and excess coating was wiped off by using a rubber blade or a Myar rod. This release coating was then cured at 350° F. for 15 seconds in an oven. Crosslinking of the PVA by the chromium in the release layer took place. This coated substrate was subjected to a water bead test and a tape release test.

Water Bead Test

A drop of water was placed onto the cured and crosslinked coated surface and the water was observed to bead up. Before the release coating was applied, the a drop of water tended to blush across the surface (wet the surface) instead of beading up. Another drop of water was placed onto the coated surface while holding the substrate at an angle. Here, the water bead traveled down the surface leaving a small trail of droplets behind. On a scale of 0 to 5, with 0 being the worst performance, this sample registered a value of 2.

Tape Release Test

A strip of Scotch Tape™ was placed on the surface of the coated paper and ¾ of the length of tape was smoothed over the coated surface to insure a good bond. The tape was then pulled from the surface and the force required to pull off the tape was measured. A scale of 0 to 5 was used to measure performance, with 0 being the worst (strong force needed to remove tape). This sample registered a value of 2.

EXAMPLE 13

This example demonstrates the use of a simplified barrier coating formulation, metallization and film transfer process to produce a coated paper material with excellent barrier and release properties.

A coating solution was prepared containing:

| |
|---|
| 40.0 g Airvol ™ 125 super hydrolyzed PVA (4% solids) |
| 3.6 g Quilon ® C-9 (49% solids) |

This coating solution was cast onto a Mylar substrate using a # 15 Myar Rod as in example 12. This applied the coating at a rate of 5 lbs per 1000 square feet. A smooth, even coating was observed with no "fish-eyes" evident. The coating had a slight green tint. The coating was cured by placing the coated Mylar substrate into an oven at 260° F. for 30 seconds. The coating dried evenly with a faint clear green tint. This coating when subjected to the water resistance test described in example 12 exhibited resistance to a water drop for greater that 3 minutes. On subjection to the oil resistance test (example 12), vegetable oil did not penetrate the coating after 3 minutes of exposure. This coating was subjected to the tape release test described in example 12, and it registered a value of 5 demonstrating excellent release characteristics. The wet rub test (example 12) demonstrated that the coating exhibited frosting and shadowing after 30 seconds of rubbing.

The coated Mylar substrate was passed through a corona discharge on the coated side. This was to prepare the surface of the coating for metallization. After the corona treatment, the coating exhibited poor water resistance and poor wet rub characteristics. This treated coating was then overcoated with a vinyl acetate ethylene copolymer based adhesive made by Swift Adhesives (#48105) using a #5 Myar Rod. This coating was then cured at 260° F. for 30 seconds. This coated substrate was then metallized (evaporated aluminum) to 20% light transmission on top of the adhesive layer. It was determined by independent experimentation that a metallized layer with 15–25 % light transmittance provided the desired appearance and was useable as a susceptor material in microwave ovens. The metal layer exhibited good adhesion to the coated substrate. This metallized coating was then coated with Swift adhesive #48105 using a #5 Myar Rod and laminated with 69# Kraft liner board as described in example 12. Upon removal of the Mylar carrier film, the coated paper substrate exhibited a very high gloss, aluminum foil like surface. This coated paper substrate was then subjected to indirect heat (1 minute at 250° F.) or to a hot surface (5 seconds at 350° F.) to remove the effects of the corona treatment of the barrier film. Exposure to air for an extended time also tends to reverse the affects of the corona treatment. This coating exhibited excellent water resistance, oil resistance, wet rub resistance, and release as determined by the water resistance test, the oil resistance test, the wet rub test and the release test described in example 12. This film was also subjected to a freeze test.

Freeze Test

A strip of adhesive tape was applied to the coated surface as described in the release test in example 12. The coated sheet material with the tape on the surface was then put into a Ziplock® polyethylene bag and sealed. This was then put into a freezer at minus 25° F. for 1 hour. The bag was then removed from the freezer, and the tape was pulled from the surface. Good release characteristics were observed; the barrier coating remained bonded to the paper substrate. No cracking or delamination was observed.

EXAMPLE 14

This example demonstrates the use of a styrene-maleic anhydride copolymer as a crosslinking agent for PVA in the barrier coating. An aqueous coating formulation comprised of:

| |
|---|
| 50.0 g Airvol ™ 125 Super Hydrolyzed PVA (6.8% solids) |
| 1.93 g Scripset ® 720 Styrene Maleic Anhydride copolymer (25% solids) | was cast onto a 3 mil Mylar substrate using a #14 Myar rod as described in example 12. The coating was applied at a rate of 6 lbs per 1000 square feet and did not exhibit any fish-eyes. This coating was cured in an oven for 90 seconds at 248° F. The wet coating lost 94.8% of its original weight by this treatment. The following table provides rates of water evaporation upon heat treatment of coatings at 248° F.:

| Time (sec) | Mylar wt. (gm) | Coated Mylar wt. (gm) | Dried coating + Mylar | Wet coating wt. (gm) | Dry coating wt. (gm) | % Original wt. | % solids after drying | % moisture after dry |
|---|---|---|---|---|---|---|---|---|
| 0 | | | | | | 100% | 5.2% | 94.8% |
| 5 | 2.4028 | 3.0963 | 2.7963 | 0.6935 | 0.3935 | 56.7% | 8.4% | 91.6% |
| 10 | 2.4030 | 3.0699 | 2.7533 | 0.6669 | 0.3503 | 52.5% | 10.0% | 90.0% |
| 20 | 2.3997 | 2.9286 | 2.4712 | 0.5289 | 0.0715 | 13.5% | 38.5% | 61.5% |
| 30 | 2.4234 | 2.9043 | 2.4411 | 0.4809 | 0.0177 | 3.7% | 100+% | 0% |
| 150 | 2.5216 | 3.1795 | 2.5561 | 0.6579 | 0.0345 | 5.2% | 100% | 0% |

The cured coating was subjected to the water resistance test described in example 12. After 6 minutes, the water drop did not penetrate the film demonstrating excellent water resistance. The coating also demonstrated excellent oil resistance (no oil penetration after 3 min in oil resistance test) and excellent wet rub resistance (no penetration after 1 min in wet rub test).

The Mylar carrier with the cured barrier coating was overcoated with an adhesive from National Starch and Chemical Company (#309793). This was then laminated to Kraft virgin linerboard (69#, 18 pt) by passing first through cold high pressure rollers, then through hot (350° F.) high pressure rollers. This process of cold then hot lamination allows the adhesive first to penetrate into the paper surface partially forming a bond. The application of heat then accelerates the evaporation of water from the adhesive layer thereby setting the bond between the coating and the paper. A cold roller (40° F.) was then passed over the Mylar surface. This shocked the barrier coating and caused it to release from the Mylar carrier. The paper substrate containing the barrier coating was post cured at 300° F. for 3 minutes. This lamination process was repeated for the other side of the paper substrate providing a high gloss, sealed non-porous paper article. This substrate exhibited good water resistance (3 min), outstanding oil resistance (3 min), excellent wet rub resistance (90 seconds), but poor release characteristics (measured value of 0 in release test). A release coating was applied to one side of the barrier coated paper substrate. The release coating was comprised of:

40 g water at 80° F.
5 g Quilon ® L
5 g neutralizer

This coating was poured over the surface of the barrier coated paper substrate. A hard rubber blade was then pulled across the surface to remove excess release coating. By this technique, the release coating was applied at the rate of 0.5 to 1.0 lb per 1000 square feet. The wet coated substrate was then put into an oven at 350° F. for 30 seconds to effect the crosslinking and setting of the chromium complexes in the release coating to the polyvinyl alcohol based barrier coating. This treated paper substrate exhibited excellent water repellency (value of 4 in water repellency test) and excellent wet rub characteristics. Water drops evaporated from the surface of the treated substrate using heat showed no change in film appearance. The treated surface also showed excellent release characteristics (value of 5 in release test described in example 12). This coated paper substrate was then subjected to a baking test.

Baking Test

The treated paper substrate describe above was formed by cutting and scoring into a 9×4.5×1 inch baking pan. The corners were glued using an adhesive containing a wetting agent. Winn Dixie™ brand cinnamon rolls (eight) were placed into the pan and baked in a gas oven for 14 minutes at 400° F. The baked rolls were removed from the oven and the pan was turned over. All eight rolls released completely and fell out. There were no odors observed from the baking pan, and there was no sign of oil penetration through the barrier layer into the paper substrate. The rolls exhibited excellent browning on the bottom.

EXAMPLE 15

This example demonstrates the use of PVA crosslinked with a chromium complex as the barrier coating. A metal plate was heated until its surface reached 240° F. A non-porous Mylar carrier film was placed on the hot metal surface and the temperature of Mylar surface was monitored and controlled between 230–250° F. A coating formulation comprising DuPont Elvanol® 7130 (medium viscosity, 9% solids in water) was poured onto the hot Mylar surface then immediately spread using a #20 Myar rod. The surface of the coating in contact with the air formed a gel. The coated carrier film was removed from the hot plate and a 33# Kraft porous paper was placed in contact with the semi-liquidous coating. The composite laminate was then put under high pressure and heated to 350° F. to bond the paper substrate to the coating. At this point, the Mylar carrier film easily released from the coating leaving a very high gloss like surface on the paper. The coated paper substrate was post cured in an oven for 1 minute at 300° F. A drop of water on the cured surface was observed to blush and spread after 3 minutes demonstrating that the coating had only fair water resistance. The coating also demonstrated very good oil resistance (3 min), but poor release characteristics (value of 1 in release test). A release coating (and cross-linking) treatment was then applied. The release coating/cross-linking treatment was comprised of:

40 g Water
5 g Quilon ® L
5 g Neutralizer

This coating formulation was poured generously over the cured surface of the above coated paper substrate. A hard rubber blade was then pulled across the surface to remove the excess coating. By this method, the release coating was applied at a rate of about 0.5 to 1.0 lbs per 1000 square feet. The freshly treated substrate was placed into an oven for 30 seconds at 350° F. to induce crosslinking and setting of the chromium complex in the release coating formulation to the polyvinyl alcohol in the barrier coating. A water bead on the treated surface now registered a 4 in the water repellency test described in example 12 demonstrating excellent water repellency. The coated paper substrate also exhibited outstanding oil holdout in the oil repellency test (example 12) and excellent release in the release test (registered a value of 5).

This coated paper substrate was subjected to the baking test describe in example 14. All eight cinnamon rolls released completely after baking. The paper pan exhibited excellent oil holdout, and there were no bad odors observed during the baking process. The rolls exhibited consistent browning on the bottom.

EXAMPLE 16

A barrier coating composition of the following formulation was prepared:

---
20.00 g Airvol ™ 125 Super Hydrolyzed PVA (8% solids in water)
1.43 g Polycup ® 172 Polyamines (12.5% solids in water)
---

This coating was poured onto a 3 mil thick Mylar film surface and spread using a #15 Myar rod to evenly coat the surface. The coating was applied at the rate of 5 lbs per 1000 square feet. The coating evenly coated the Mylar as evidenced by the lack of fish-eyes in the coating. This coated substrate was placed into an oven for 1 minute at 350° F. The coating dried clear and hard demonstrating effective crosslinking of the PVA. This coating exhibited very good water resistance and outstanding oil resistance. This coating also did not break up after 1 minute of rubbing in the wet rub test.

This cured barrier coating was overcoated with Swiftos adhesive #48105 using a #5 Myar rod. The wet adhesive was then bonded to 69# Kraft virgin linerboard through a high pressure lamination process. The laminate was then passed through a series of heated high pressure rollers (350° F.) which caused the adhesive to set, and the Mylar carrier to release from the barrier coating. The coated paper substrate was then post cured for 30 seconds at 300° F. to evaporate any remaining water in the coating. The original dull surface of the Kraft paper was now extremely glossy and non-porous. This barrier coating exhibited excellent water resistance (3 minutes), excellent wet rub characteristics (1 minute), and the same oil resistance as before the transfer process. This barrier coating exhibited poor release characteristics (measured 1 in the tape release test described in example 12).

A release coating was applied to the barrier coating comprised of:

---
40 g Water at 80° F.
5 g Quilon ® L
5 g Neutralizer
---

This coating solution was poured over the barrier coat on the paper substrate and spread using a rubber blade to completely cover the surface and remove excess coating. This technique applied the coating at a rate of 0.5 to 1.0 lb per 1000 square feet. The wet coated substrate was placed in an oven for 30 seconds at 350° F. to cause rapid crosslinking and bonding of the chromium complex in the Quilon® to the PVA/Polycups barrier layer. This treated surface measured a value of 4 in the water repellency test (described in example 12), and exhibited excellent wet rub characteristics. The treated surface now measured a value of 4 in the tape release test demonstrating excellent release characteristics.

The foregoing description of specific embodiments of the invention will so fully reveal the general nature of the invention that others can, by applying current knowledge, readily modify and/or adapt for various applications such specific embodiments without departing from the engineering concept, and, therefore, such adaptation and modification should and are intended to be comprehended within the meaning and range of the invention. It is to be understood that the phraseology and terminology employed herein is for the purposes of description and not of limitation.

What is claimed is:

1. A coated sheet material comprised of:
   a porous substrate sheet material having at least two oppositely disposed surfaces; and
   a barrier coating on at least one surface of said substrate sheet material wherein said barrier coating is formed from a dispersion comprised of a mixture of: (i) a cross-linkable first polymer that is resistant to penetration by water moisture when cured, and (ii) a water-dispersible, film-forming second polymer that is resistant to penetration by grease and oil when cured, wherein said first and second polymers are different.

2. The coat sheet material as recited in claim 1, wherein said substrate sheet material comprises cellulose.

3. The coated sheet material as recited in claim 1, wherein said water-dispersible, film-forming polymer is selected from the group consisting of: poly(butylene alcohol), poly (propylene alcohol), poly(vinyl alcohol), poly(hydroxyethyl acrylate), and polyvinyl acetate, and copolymers derived from any of the foregoing.

4. The coated sheet material as recited in claim 1, wherein the cross-linkable polymer and the water dispersible polymer are selected from the group consisting of poly(vinyl alcohol)s, poly(butylene alcohol)s, poly(propylene alcohol)s, poly(1-(hydroxylmethyl) ethylene), poly(1-hydroxylethyl) ethylene), and copolymers derived therefrom.

5. The coated sheet material as recited in claim 1, wherein said cross-linkable polymer has an average molecular weight before curing of greater than 5,000 and is selected from the group consisting of: poly(dienes), poly (methacrylics), poly(acrylamides), poly(methacrylic acids), poly(vinyl ethers), poly(vinyl halides), poly(vinyl esters) and hydrolyzed or partially hydrolyzed derivatives thereof, poly(styrenes), poly(oxides), poly(carbonates), poly(esters), poly(anhydrides), poly(urethanes), poly(siloxanes), poly (sulfones), poly(sulfonamides), poly(amides), poly(imines), poly(benzimidazoles), carbohydrates, poly(vinyl alcohol), poly(propyl alcohol), poly(butyl alcohol), poly(1-(hydroxylmethyl) ethylene), poly(1-hydroxyethyl) ethylene, styrene butadiene, hydroxylated polymers, and copolymers derived from any of the foregoing.

6. The coated sheet material as recited in claim 5, wherein said water-dispersible, film-forming polymer is selected from the group consisting of: poly(butylene alcohol), poly (propylene alcohol), poly(vinyl alcohol), poly(hydroxyethyl acrylate), and polyvinyl acetate, and copolymers derived from any of the foregoing.

7. The coated sheet material as recited in claim 6, wherein said cross-linkable polymer is crosslinked by a crosslinking agent selected from the group consisting of: maleic anyhdride, polymers comprising maleic anhydride, copolymers comprising maleic anhydride, glyoxals, anhydrides, ethyl oxylate, epichlorohydrin, polymers comprising epichlorohydrin, copolymers comprising epichlorohydrin, metal ions, fatty acid complexes of metal ions, exposure to heat, high energy radiation, gamma radiation, x-rays, ultraviolet radiation, visible radiation, electron beams, corona discharges, and combinations thereof.

8. The coated sheet material of claim 1, wherein the barrier layer coating additionally comprises any combination of fillers, dyes, pigments, colorants, metallized layers, printing, gloss, and texture.

9. The coated sheet material of claim 1 further comprising a release coating on said barrier coating.

10. The coated sheet material as recited in claim 9, wherein said release coating is comprised of a fatty acid compound.

11. The coated sheet material as recited in claim 10, wherein said fatty acid compound is a metal complex of a fatty acid.

12. The coated sheet material as recited in claim 10, wherein said fatty acid compound is a chrome complex of a fatty acid.

13. The coated sheet material as recited in claim 9, wherein said release coating comprises a metal complex of a fatty acid compound.

14. The coated sheet material as recited in claim 13, wherein said substrate sheet material comprises cellulose.

15. The coated sheet material as recited in claim 14, wherein said sheet material has a basis weight of between about 20 pounds per 1000 square feet of sheet material and about 40 pounds per 1000 square feet of sheet material.

16. The coated sheet material as recited in claim 15, wherein said sheet material is a corrugated sheet material, and is ovenable in a conventional oven at temperatures of about 400° F.

17. The coated sheet material as recited in claim 16, wherein said coated sheet material is dual-ovenable.

18. The coated sheet material of claim 17, wherein said substrate material comprises cellulose; said barrier coating is comprised of a polyvinyl alcohol; and said release coating is comprised of a fatty acid complex of chromium.

19. The coated sheet material of claim 1 wherein the first polymer is crosslinked polyvinyl alcohol and the second polymer is uncrosslinked polyvinyl alcohol.

20. An article comprised of:
   a porous substrate material having at least two oppositely disposed surfaces; and
   a barrier coating on at least one surface of said substrate material wherein said barrier coating is formed from a dispersion comprised of a mixture of: (i) a cross-linkable first polymer that is resistant to penetration by water moisture when cured, and (ii) a water-dispersible, film-forming second polymer that is resistant to penetration by grease and oil when cured wherein said first and second polymers are different.

21. The article as recited in claim 20, wherein said cross-linkable polymer has an average molecular weight before curing of greater than 5,000 and is selected from the group consisting of: poly(dienes),poly(methacrylics), poly(acrylamides), poly(methacrylic acids), poly(vinyl ethers), poly(vinyl halides), poly(vinyl esters) and hydrolyzed or partially hydrolyzed derivatives thereof, poly(styrenes), poly(oxides), poly(carbonates), poly(esters), poly(anhydrides), poly(urethanes), poly(siloxanes), poly(sulfones), poly(sulfonamides), poly(amides), poly(imines), poly(benzimidazoles), carbohydrates, poly(vinyl alcohol), poly(propyl alcohol), poly(butyl alcohol),poly(1-(hydroxylmethyl) ethylene), poly(1-hydroxyethyl) ethylene, styrene butadiene, hydroxylated polymers, and copolymers derived from any of the foregoing.

22. The coated sheet material as recited in claim 21, wherein said water-dispersible, film-forming polymer is selected from the group consisting of: poly(butylene alcohol), poly(propylene alcohol), poly(vinyl alcohol), poly(hydroxyethyl acrylate), and polyvinyl acetate, and copolymers derived from any of the foregoing.

23. The coated sheet material as recited in claim 22, wherein the crosslinkable polymer and the water dispersible polymer are selected from the group consisting of poly(vinyl alcohol)s, poly(butylene alcohol)s, poly(propylene alcohol)s, poly(1-(hydroxylmethyl) ethylene), poly(1-hydroxylethyl) ethylene), and copolymers derived therefrom.

24. The coated sheet material as recited in claim 21, wherein said cross-linkable polymer is crosslinked by a crosslinking agent selected from the group consisting of: maleic anyhdride, polymers comprising maleic anhydride, copolymers comprising maleic anhydride, glyoxals, anhydrides, ethyl oxylate, epichlorohydrin, polymers comprising epichlorohydrin, copolymers comprising epichlorohydrin, metal ions, fatty acid complexes of metal ions, exposure to heat, high energy radiation, gamma radiation, x-rays, ultraviolet radiation, visible radiation, electron beams, corona discharges, and combinations thereof.

25. The article as recited in claim 20, wherein said cross-linkable polymer is a polyvinyl alcohol.

26. The article as recited in claim 20, wherein said water-dispersible, film-forming polymer is a polyvinyl alcohol.

27. The article as recited in claim 20, wherein said release coating is comprised of a metal complex of a fatty acid.

28. The article of claim 20 further comprising a release coating on said barrier coating.

29. The coated sheet material of claim 20 wherein the first polymer is crosslinked polyvinyl alcohol and the second polymer is uncrosslinked polyvinyl alcohol.

30. A coated sheet material comprised of:
   a porous substrate sheet material having at least two oppositely disposed surfaces;
   a barrier coating on at least one surface of said substrate sheet material wherein said barrier coating is formed from a dispersion comprised of a mixture of: (i) a cross-linkable first polymer that is resistant to penetration by water moisture when cured, and (ii) a water-dispersible, film-forming second polymer that is resistant to penetration by grease and oil when cured, wherein said first and said second polymers are different; and
   a release coating on said barrier coating.

31. The coated sheet material of claim 30 wherein the first polymer is crosslinked polyvinyl alcohol and the second polymer is uncrosslinked polyvinyl alcohol.

32. An article comprised of:
   a porous substrate material having at least two oppositely disposed surfaces;
   a barrier coating on at least one surface of said substrate material wherein said barrier coating is formed from a dispersion comprised of a mixture of: (i) a cross-linkable first polymer that is resistant to penetration by water moisture when cured, and (ii) a water-dispersible, film-forming second polymer that is resistant to penetration by grease and oil when cured, wherein said first and second polymers are different; and
   a release coating on said barrier coating.

33. The coated sheet material of claim 32 wherein the first polymer is crosslinked polyvinyl alcohol and the second polymer is uncrosslinked polyvinyl alcohol.

* * * * *

UNITED STATES PATENT AND TRADEMARK OFFICE
CERTIFICATE OF CORRECTION

PATENT NO. : 5,981,011
DATED : November 9, 1999
INVENTOR(S) : Derric T. Overcash, et. al.

It is certified that error appears in the above-identified patent and that said Letters Patent is hereby corrected as shown below:

Title page, Related U.S. Application Data [63], delete "Continuation-in-part of application No. 07/823,877, Jan. 22, 1992, Pat. No. 5,603,996." and insert --Continuation-in-part of application No. 08/119,143, Jan. 22, 1993, Pat. No. 5,603,996, which is a continuation-in-part of application No. 07/823,877, Jan. 22, 1992, abandoned.--

Signed and Sealed this

Fifth Day of December, 2000

Attest:

Q. TODD DICKINSON

*Attesting Officer*  *Director of Patents and Trademarks*